(12) United States Patent
Le et al.

(10) Patent No.: US 11,514,930 B1
(45) Date of Patent: Nov. 29, 2022

(54) SOFT BIAS SIDE SHIELD STABILIZED BY HARD BIAS FOR READ HEAD DESIGN

(71) Applicant: Western Digital Technologies, Inc., San Jose, CA (US)

(72) Inventors: Quang Le, San Jose, CA (US); Hongquan Jiang, San Jose, CA (US); Hisashi Takano, San Jose, CA (US); Cherngye Hwang, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/359,132

(22) Filed: Jun. 25, 2021

(51) Int. Cl.
   *G11B 5/31* (2006.01)
   *G11B 5/11* (2006.01)

(52) U.S. Cl.
   CPC .............. *G11B 5/3109* (2013.01); *G11B 5/11* (2013.01)

(58) Field of Classification Search
   None
   See application file for complete search history.

(56) References Cited

U.S. PATENT DOCUMENTS

| | | | |
|---|---|---|---|
| 5,436,778 A | 7/1995 | Lin et al. |
| 5,530,608 A | 6/1996 | Aboaf et al. |
| 5,574,605 A | 11/1996 | Baumgart et al. |
| 5,656,485 A | 8/1997 | Jacobson et al. |
| 5,923,505 A | 7/1999 | Kroes et al. |
| 5,962,153 A | 10/1999 | Kirino et al. |
| 5,963,401 A | 10/1999 | Dee et al. |
| 5,995,338 A | 11/1999 | Watanabe et al. |
| 5,998,048 A | 12/1999 | Jin et al. |
| 6,038,106 A | 3/2000 | Aboaf et al. |
| 6,185,077 B1 | 2/2001 | Tong et al. |
| 7,038,892 B2 | 5/2006 | Chau et al. |
| 7,199,975 B1 | 4/2007 | Pan |

(Continued)

FOREIGN PATENT DOCUMENTS

| EP | 2026337 B1 | 12/2010 |
|---|---|---|
| JP | H06259730 A | 9/1994 |

(Continued)

OTHER PUBLICATIONS

Dovek, M. M. et al., "Microtrack Profiling Technique for Narrow Track Tape Heads", IEEE Transactions on Magnetics, vol. 28, No. 5, Sep. 1992, pp. 2304-2306.

(Continued)

*Primary Examiner* — William J Klimowicz
(74) *Attorney, Agent, or Firm* — Patterson & Sheridan, LLP; Steven H. VerSteeg

(57) ABSTRACT

The present disclosure generally relates to magnetic storage devices, such as magnetic tape drives, comprising a read head. The read head comprises a plurality of read sensors disposed between a lower shield and an upper shield. A plurality of soft bias side shields are disposed adjacent to and outwardly of the plurality of read sensors in a cross-track direction. A plurality of hard bias side shields are disposed on and in contact with the soft bias side shields to stabilize the soft bias side shields. Each of the plurality of soft bias side shields are spaced a first distance from the lower shield and each of the hard bias side shields are spaced a second distance from the upper shield, the first distance being substantially equal to the second distance.

19 Claims, 12 Drawing Sheets

(56) References Cited

U.S. PATENT DOCUMENTS

| | | | |
|---|---|---|---|
| 7,324,309 B1* | 1/2008 | Wiesen | B82Y 25/00 |
| 7,986,485 B2 | 7/2011 | Mckinstry et al. | |
| 8,576,518 B1 | 11/2013 | Zeltser et al. | |
| 8,760,823 B1* | 6/2014 | Chen | G11B 5/3903 |
| | | | 360/324.12 |
| 8,995,087 B1* | 3/2015 | Chen | G11B 5/11 |
| | | | 360/125.3 |
| 9,087,534 B1* | 7/2015 | Chen | G11B 5/3903 |
| 9,230,576 B1 | 1/2016 | Gill et al. | |
| 9,269,383 B1 | 2/2016 | Hattori et al. | |
| 9,747,931 B1 | 8/2017 | Biskeborn et al. | |
| 9,786,301 B1* | 10/2017 | Li | G11B 5/3974 |
| 9,812,155 B1* | 11/2017 | Roy | G11B 5/3163 |
| 9,837,106 B1* | 12/2017 | Contreras | G11B 5/3977 |
| 9,947,344 B2 | 4/2018 | Biskeborn et al. | |
| 10,580,442 B2 | 3/2020 | Biskeborn et al. | |
| 10,593,357 B2* | 3/2020 | Quan | G11B 5/3912 |
| 11,054,490 B2* | 7/2021 | Tanaka | G01R 33/093 |
| 2003/0179509 A1 | 9/2003 | Pinarbasi | |
| 2005/0195535 A1 | 9/2005 | Shi et al. | |
| 2009/0086380 A1 | 4/2009 | Seagle | |
| 2010/0328799 A1 | 12/2010 | Braganca et al. | |
| 2011/0007431 A1 | 1/2011 | Braganca et al. | |
| 2011/0069413 A1 | 3/2011 | Maat et al. | |
| 2011/0141629 A1 | 6/2011 | Braganca et al. | |
| 2011/0215800 A1* | 9/2011 | Zhou | G01R 33/0011 |
| | | | 324/252 |
| 2012/0250189 A1* | 10/2012 | Degawa | G11B 5/3912 |
| 2013/0286511 A1 | 10/2013 | Edelman et al. | |
| 2014/0055884 A1 | 2/2014 | Edelman et al. | |
| 2014/0177102 A1 | 6/2014 | Kief et al. | |
| 2014/0218823 A1* | 8/2014 | McKinlay | G11B 5/3932 |
| | | | 360/128 |
| 2015/0199990 A1 | 7/2015 | Braganca et al. | |
| 2015/0221329 A1 | 8/2015 | Mashima et al. | |
| 2015/0243301 A1 | 8/2015 | Kief et al. | |
| 2015/0325260 A1* | 11/2015 | Singleton | G11B 5/3153 |
| | | | 360/324.11 |
| 2017/0154641 A1 | 6/2017 | Hao et al. | |
| 2020/0176024 A1* | 6/2020 | Quan | G11B 5/3951 |
| 2021/0158840 A1 | 5/2021 | Seagle et al. | |

FOREIGN PATENT DOCUMENTS

| | | |
|---|---|---|
| JP | H07262525 A | 10/1995 |
| JP | 2002289946 A | 10/2002 |

OTHER PUBLICATIONS

Cannon, D. M. et al., "Design and performance of a magnetic head for a high-density tape drive", IBM J. Res. Develop., vol. 30, No. 3, May 1986, pp. 270-277.

Nakashio E. et al., "Flux Guide Type Tunnel-Valve Head for Tape Storage Applications", IEEE Transactions on Magnetics, vol. 38, No. 5, Sep. 2002, pp. 1925-1927.

Biskeborn, Robert G. et al., "TMR tape drive for a 15 TB cartridge", AIP Publishing, Dec. 2017, https://aip.scitation.org/doi/10.1063/1.5007788, Last accessed Jun. 22, 2021.

* cited by examiner

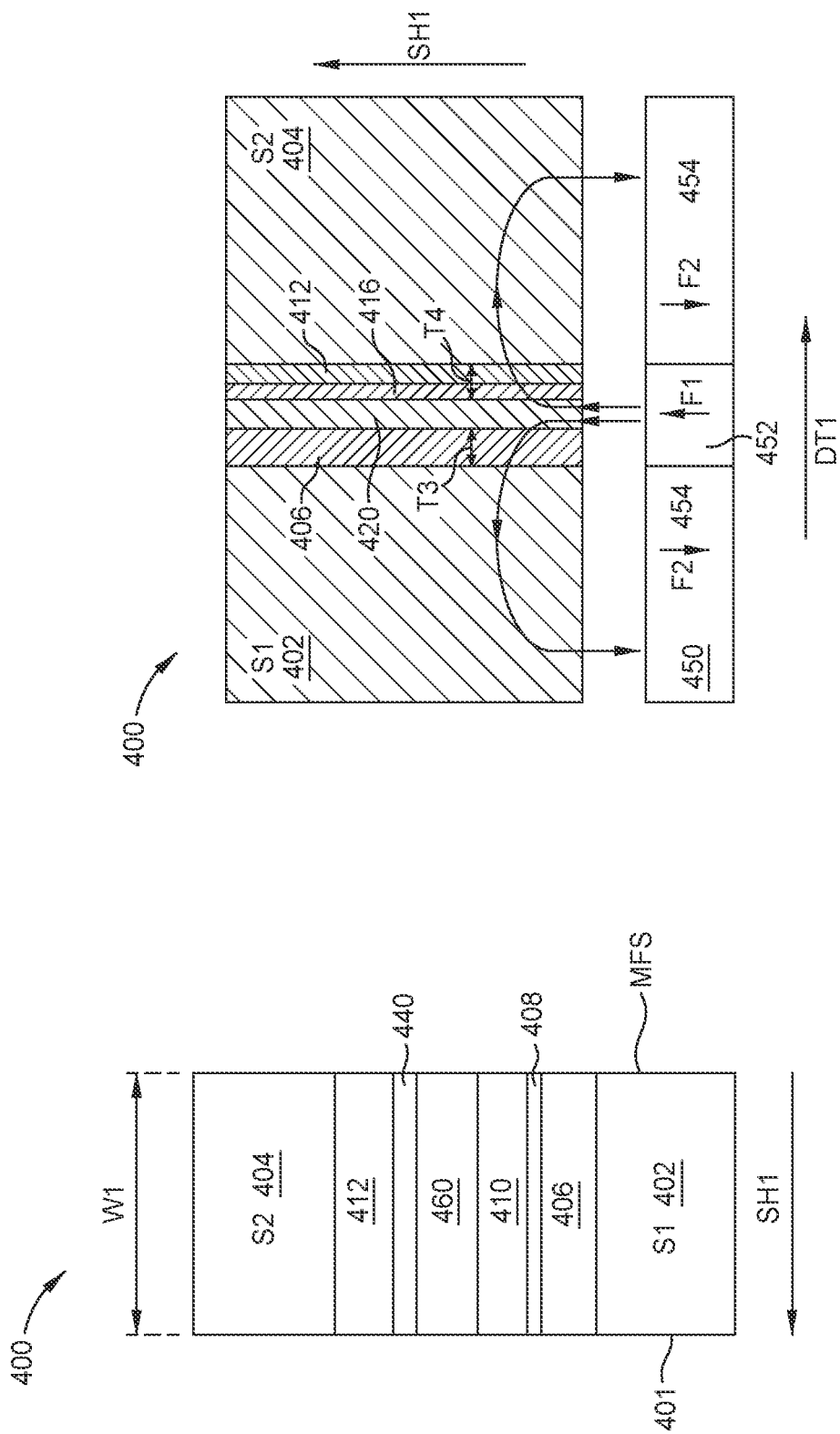

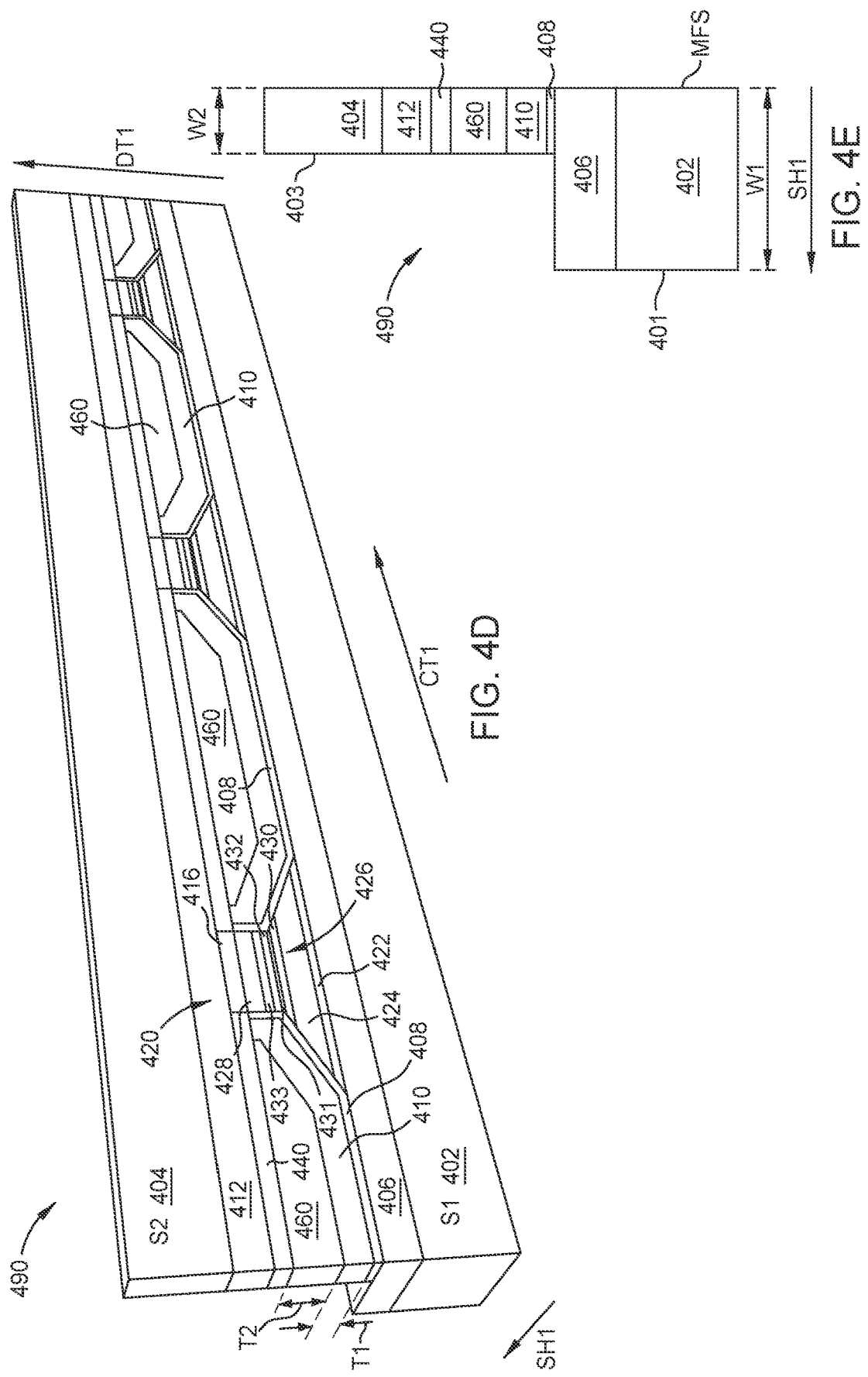

SOFT BIAS SIDE SHIELD STABILIZED BY HARD BIAS FOR READ HEAD DESIGN

BACKGROUND OF THE DISCLOSURE

Field of the Disclosure

Embodiments of the present disclosure generally relates to magnetic storage devices, such as magnetic tape drives, comprising a read head, and methods of forming thereof.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head can have servo elements and data elements that are arranged in an array that is oftentimes referred to as a tape head array.

Hard bias elements adjacent sensors in tape drives can involve a high coercivity, which can hinder device performance. Soft bias elements involve a lower coercivity but is unstable and can even move during operation of the tape drive. Soft bias elements can also involve signal shunting, hindering device performance.

Therefore, there is a need in the art for tape drives having soft bias elements that facilitate low coercivity, stability of the soft bias elements, reduced signal shunting, and enhanced device performance.

SUMMARY OF THE DISCLOSURE

The present disclosure generally relates to magnetic storage devices, such as magnetic tape drives, comprising a read head. The read head comprises a plurality of read sensors disposed between a lower shield and an upper shield. A plurality of soft bias side shields are disposed adjacent to and outwardly of the plurality of read sensors in a cross-track direction. A plurality of hard bias side shields are disposed on and in contact with the soft bias side shields to stabilize the soft bias side shields. Each of the plurality of soft bias side shields are spaced a first distance from the lower shield and each of the hard bias side shields are spaced a second distance from the upper shield, the first distance being substantially equal to the second distance.

In one embodiment, a read head comprises a lower shield, an upper shield, one or more lower leads disposed over the lower shield, one or more upper leads disposed between the one or more lower leads and the upper shield, a plurality of read sensors disposed between the one or more lower leads and the one or more upper leads at a media facing surface, each read sensor of the plurality of read sensors comprising a multilayer structure, a plurality of soft bias side shields disposed between and outwardly of the plurality of read sensors, and a plurality of hard bias side shields disposed on and in contact with the plurality of soft bias side shields.

In another embodiment, a read head comprises a lower shield, a lower lead disposed over the lower shield, an antiferromagnetic (AFM) layer disposed over the lower lead, a first layer on the AFM layer, and a plurality of read sensors disposed over the first layer at a media facing surface (MFS), each read sensor of the plurality of read sensors comprising a multilayer structure, the multilayer structure comprising: a portion of the AFM layer and a portion of the first layer. The read head further comprises a plurality of soft bias side shields disposed between and outwardly of the plurality of read sensors, a plurality of hard bias side shields disposed in contact with the plurality of soft bias side shields, one or more upper leads disposed over the plurality of read sensors, and an upper shield disposed over the one or more upper leads.

In yet another embodiment, a read head comprises a lower shield, an upper shield, one or more lower leads disposed over the lower shield, one or more upper leads disposed between the one or more lower leads and the upper shield, and a plurality of read sensors disposed between the one or more lower leads and the one or more upper leads at a media facing surface, each read sensor of the plurality of read sensors comprising a multilayer structure, the multilayer structure comprising: a buffer layer, an AFM layer disposed over the buffer layer, a free layer disposed over the AFM layer, the free layer comprising a first layer and a second layer, a barrier layer disposed over the free layer, and a cap layer disposed over the barrier layer. The read head further comprises a plurality of soft bias side shields disposed adjacent to and outwardly of the second layer, the barrier layer, and the cap layer of each read sensor, and a plurality of hard bias side shields disposed on and in contact with the plurality of soft bias side shields.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4C illustrate schematic views of a read head, according to one implementation.

FIGS. 4D-4E illustrate schematic views of a read head, according to another implementation.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to magnetic storage devices, such as magnetic tape drives, comprising a read head. The read head comprises a plurality of read sensors disposed between a lower shield and an upper shield. A plurality of soft bias side shields are disposed adjacent to and outwardly of the plurality of read sensors in a cross-track direction. A plurality of hard bias side shields are disposed on and in contact with the soft bias side shields to stabilize the soft bias side shields. Each of the plurality of soft bias side shields are spaced a first distance from the lower shield and each of the hard bias side shields are spaced a second distance from the upper shield, the first distance being substantially equal to the second distance.

Figure 1:
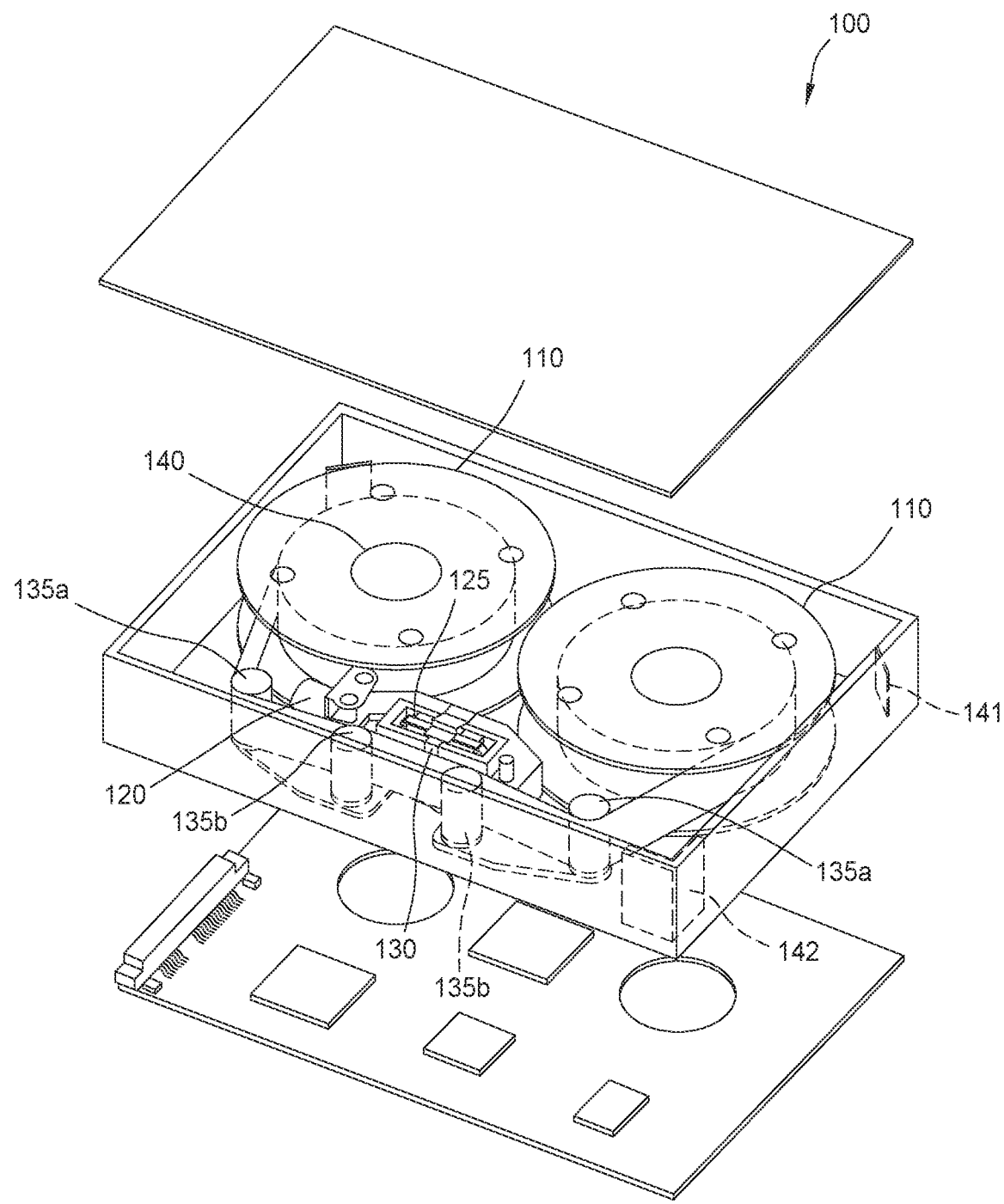
FIG. 1 is a schematic perspective exploded view of a storage device, according to one implementation.

FIG. 1 is a schematic perspective exploded view of a storage device 100, according to one implementation. The storage device 100 is a magnetic media drive. The storage device 100 will be referred to as the tape drive 100 hereafter. It is noted that while the tape drive is shown as having embedded tape for illustrative purposes, the embodiments of the invention can be applied in various forms of tape drive including a drive where the tape media is insertable such as in a media cartridge. One example is tape drives and media conforming to the LTO standard, and the various drive illustrations shown would be similar to such a drive when the media is fully inserted and engageable for data access.

Figure 2:
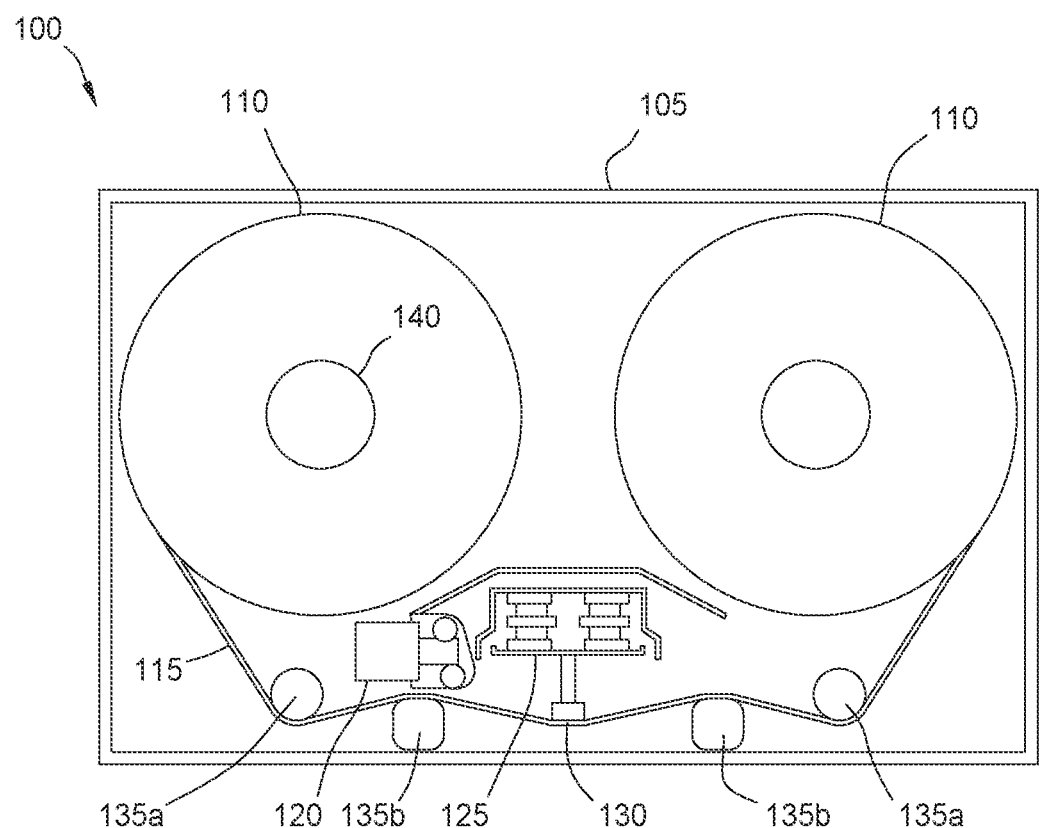
FIG. 2 is a schematic top-down view of the tape drive illustrated in FIG. 1, according to one implementation.

FIG. 2 is a schematic top-down view of the tape drive 100 illustrated in FIG. 1, according to one implementation.

Figure 3:
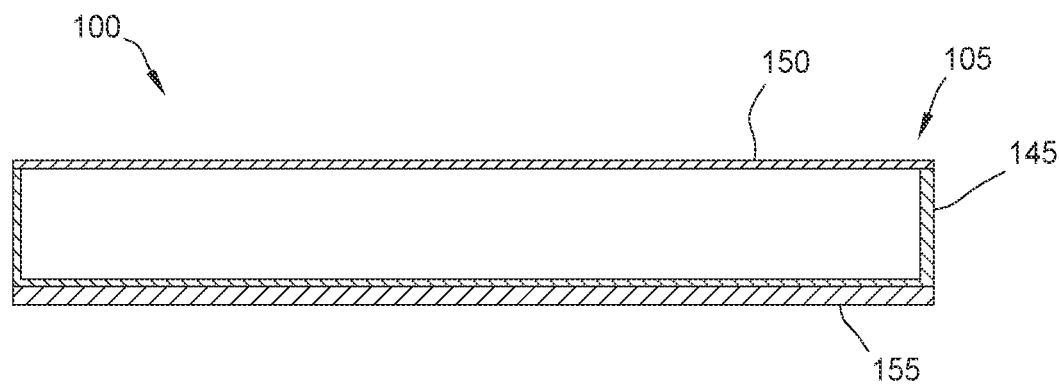
FIG. 3 is a schematic side profile view of the tape drive illustrated in FIG. 1, according to one implementation.

FIG. 3 is a schematic side profile view of the tape drive 100 illustrated in FIG. 1, according to one implementation.

Focusing on FIG. 2, for example, the tape drive 100 includes an enclosure that includes a casing 105, one or more tape reels 110, one or more rotors (e.g., a stepping motor 120) (also known as a stepper motor), a voice coil motor (VCM) 125, a head assembly 130 with one or more read heads and one or more write heads, and tape guides/rollers 135a, 135b. Focusing on FIG. 3, for example, the tape drive 100 also includes a printed circuit board assembly 155 (PCBA). In one embodiment, which can be combined with other embodiments, most of the components are within an interior cavity of the casing 105, except the PCBA 155, which is mounted on an external surface of the casing 105. The same components are illustrated in a perspective view in FIG. 1.

In the illustrated implementations, two tape reels 110 are placed in the interior cavity of the casing 105, with a center of each of the two tape reels 110 on the same level in the cavity. As shown in FIGS. 1 and 2, the head assembly 130 is located between and below the two tape reels 110. Tape reel motors located in the spindles of the tape reels 110 can operate to wind and unwind the tape media 115 into and out of the tape reels 110. Each tape reel 110 may also incorporate a tape folder to help the tape media 115 be neatly wound onto the respective tape reel 110. The tape media 115 may be made via a sputtering process to provide improved areal density. The tape media 115 includes two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

In one embodiment, which can be combined with other embodiments, the guides/rollers 135 utilize the same structure, as shown in FIG. 1. In one embodiment, which can be combined with other embodiments, the guides/rollers 135 may have more specialized shapes and differ from each other based on function, as shown in FIG. 2. A lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and the stepping motor 120 may variably position the tape head(s) transversely with respect to the width of the recording tape (e.g., the tape media 115). The stepping motor 120 may provide coarse movement, while the voice coil motor 125 may provide finer actuation of the head(s) of the head assembly 130. In one embodiment, which can be combined with other embodiments, servo data may be written to the tape media 115 to aid in more accurate position of the head(s) along the tape media 115.

The casing 105 includes one or more particle filters 141 and/or desiccants 142, as illustrated in FIG. 1, to help maintain the environment in the casing 105. For example, if the casing 105 is not airtight, the particle filters 141 may be placed where airflow is expected. The particle filters 141 and/or desiccants 142 may be placed in one or more of the corners or any other convenient place away from the moving internal components. For example, the moving tape reels 110 may generate internal airflow as the tape media 115 winds/unwinds, and the particle filters 141 may be placed within that airflow.

There is a wide variety of possible placements of the internal components of the tape drive 100 within the casing 105. In particular, as the head assembly 130 is internal to the casing 105 in certain examples, the tape media 115 may not be exposed to the outside of the casing 105. Thus, the tape media 115 does not need to be routed along the edge of the casing 105 and can be freely routed in more compact and/or otherwise more efficient ways within the casing 105. Similarly, the head(s) and tape reels 110 may be placed in a variety of locations to achieve a more efficient layout, as there are no design requirements to provide external access to these components.

As illustrated in FIG. 3, the casing 105 includes a cover 150 and a base 145. The PCBA 155 is attached to the bottom, on an external surface of the casing 105, opposite the cover 150. The base 145 includes three walls and the cover 150 includes a fourth wall to form four walls of a plurality of walls of the casing 105 that is included in the enclosure of the tape drive 100. As the PCBA 155 is made of solid state electronics, environmental issues are less of a concern, so it does not need to be placed inside the casing 105. That leaves room inside the casing 105 for other components, particularly, the moving components and the tape media 115 that would benefit from a more protected environment.

In one embodiment, which can be combined with other embodiments, the tape drive 100 is sealed. Sealing can mean the tape drive 100 is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, which can be combined with other embodiments, the cover 150 is used to hermetically seal the tape drive 100. For example, the tape drive 100 may be hermetically sealed for environmental control by attaching (e.g., laser welding, adhering using adhesive, etc.) the cover 150 to the base 145. The tape drive 100 may be filled by helium, nitrogen, hydrogen, or any other typically inert gas.

In one embodiment, which can be combined with other embodiments, other components may be added to the tape drive 100. For example, a pre-amp for the heads of the head assembly 130 may be added to the tape drive 100. The pre-amp may be located on the PCBA 155, in the head assembly 130, or in another location. In general, placing the pre-amp closer to the heads may have a greater effect on the read and write signals in terms of signal-to-noise ratio (SNR). In one embodiment, which can be combined with other embodiments, some of the components may be omitted. For example, the particle filters 141 and/or the desiccant 142 may be omitted.

Figure 4A:
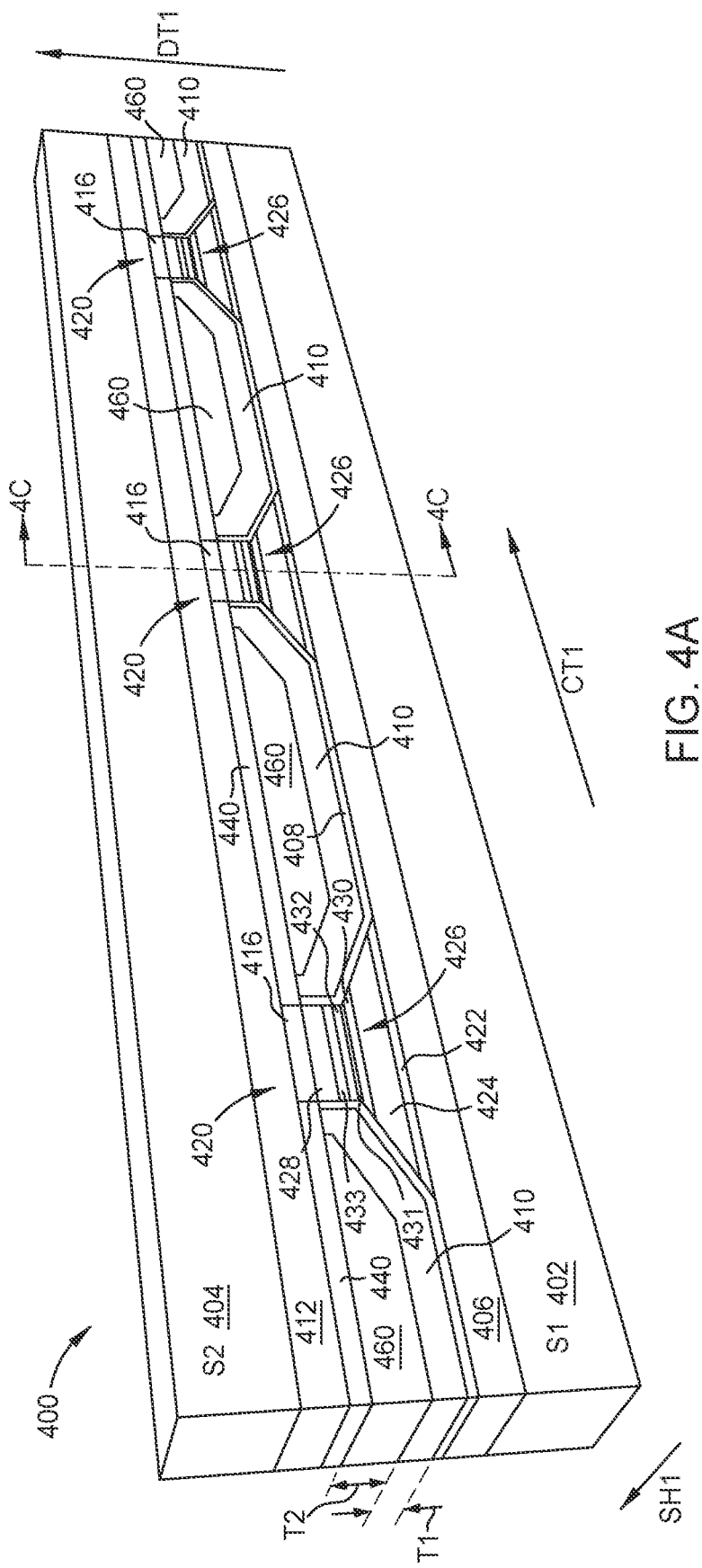

FIGS. 4A-4C illustrate schematic views of a read head 400, according to one implementation. FIG. 4A is a schematic isometric media facing surface (MFS) view of a read head 400, according to one implementation. FIG. 4B is a schematic isometric side cross-sectional view of the read head 400 shown in FIG. 4A, according to one implementation. FIG. 4C is a schematic cross-sectional view, along Section 4C-4C, of the read head 400 shown in FIG. 4A, according to one implementation.

The read head 400 can be used as part of the tape drive 100 (a magnetic storage device) shown in FIG. 1. The read head 400 comprises a lower shield (S1) 402, an upper shield (S2) 404, and a plurality of read sensors 420 disposed between the lower shield 402 and the upper shield 404. While three read sensors 420 are shown in FIG. 4A, the read head 400 may comprise any number of read sensors 420, and the number of read sensors 420 is not intended to be limiting.

A lower lead 406 is disposed between the lower shield 402 and the plurality of read sensors 420. As shown in FIG. 4A, the lower lead 406 is common to each read sensor 420. However, in some embodiments, each read sensor 420 may have a separate lower lead 406 (not shown). The read head 400 comprises a plurality of upper leads 416 disposed above each of the plurality of read sensors 420 in a down-track direction (DT1). Similar to the lower lead 406, the plurality of upper leads 416 may be one upper lead 416 common to each read sensor 420. A first insulation layer 412 is disposed between the upper shield 404 and the plurality of upper leads 416. A second insulation layer 408 is disposed on the lower lead 406 and surrounding each of the read sensors 420 in the down-track direction. A third insulation layer 440 is disposed adjacent to and between each of the plurality of upper leads 416. Each of the first insulation layer 412, the second insulation layer 408, and the third insulation layer 440 may comprise the same material or a different material.

Each read sensor 420 of the plurality of read sensors 420 includes a multilayer structure. The multilayer structure of each read sensor 420 includes a buffer layer 422 disposed on the lower lead 406, an antiferromagnetic (AFM) layer 424 disposed on the buffer layer 422, and a free layer 426 disposed on the AFM layer 424. Each read sensor 420 includes a cap layer 428 disposed on the free layer 426. The buffer layer 422 is disposed between the AFM layer 424 and the lower lead 406. The buffer layer 422 is substantially aligned with a portion of the second insulation layer 408 in a cross-track direction (CT1). The cap layer 428 is non-ferromagnetic. Each layer 422, 424, 426, 428 of each read sensor 420 has length in the cross-track direction less than a length in the cross-track direction of the lower shield 402.

The free layer 426 of each read sensor 420 includes a plurality of layers 430-433. The free layer 426 is ferromagnetic. The free layer 426 includes two layers, a first layer 430 and a second layer 432, separated by a spacer layer 431. Each of the two layers 430, 432 is formed of one or more of cobalt (Co), iron (Fe), and/or boron (B). The spacer layer 431 is formed of magnesium oxide (MgO) and is of a length along the down-track direction DT1 that is within a range of about 5 Angstroms to about 200 Angstroms, such as about 20 Angstroms. A barrier layer 433 of the free layer 426 is disposed between the second layer 432 and the cap layer 428.

The read head 400 includes a plurality of soft bias side shields 410 disposed between and outwardly of the plurality of read sensors 420, disposed on and in contact with the second insulation layer 408. Each of the soft bias side shields 410 is magnetic, conductive, and has a low coercivity. The soft bias side shields 410 facilitate biasing the magnetic read field of the read sensors 420 during magnetic reading operations. The soft bias side shields 410 facilitate a magnetic field in the cross-track direction during the magnetic reading operations.

A plurality of hard bias side shields 460 are disposed in contact with the plurality of soft bias side shields 410 and the third insulation layer 440. The plurality of hard bias side shields 460 are spaced from the sensors 420 by the plurality of soft bias side shields 410. The plurality of soft bias side shields 410 have a thickness T1 in the down-track direction (DT1) that is different or equal to a thickness T2 of the plurality of hard bias side shields 460 in the down-track direction depending on the various designs. The plurality of hard bias side shields 460 have a high coercivity and pin the magnetization of the soft bias side shields 410 in a desired direction, such as in the cross-track direction. The plurality of hard bias side shields 460 help stabilize the plurality of soft bias side shields 410 to enhance magnetic reading operations while minimizing signal shunting.

FIG. 4B is a schematic isometric side cross-sectional view of the read head 400 shown in FIG. 4A, according to one implementation. As shown in FIG. 4B, the lower shield 402, the lower lead 406, the second insulation layer 408, the soft bias side shields 410, the hard bias side shields 460, the third insulation layer 440, the read sensors 420, the first insulation layer 412, and the upper shield 404 each have a first width W1 in the stripe height direction (SH1) from the MFS to a first surface 401 opposite the MFS.

FIG. 4C is a schematic cross-sectional view, along Section 4C-4C, of the read head 400 shown in FIG. 4A, according to one implementation. The general cross-sectional view shown in FIG. 4C is applicable to the read heads 490-1100 of FIGS. 4D-11. The lower lead 406 has a third thickness T3. The first insulation layer 412, the third insulation layer 440, and the upper leads 416 between the upper shield 404 and hard bias side shields 460 collectively have a fourth thickness T4. The fourth thickness T4 is substantially equal to the third thickness T3 such that a difference between the fourth thickness T4 and third thickness T3 is about 50 nm or less. The fourth thickness T4 being substantially equal to the third thickness T3 facilitates stabilization of the read sensors 420 by helping to stabilize the soft bias side shields 410, thereby enhancing magnetic reading operations while minimizing signal shunting.

During magnetic reading operations, a tape media 450 moves past the read sensors 420 in the down-track direction. A portion 452 of the tape media 450 aligned with the read sensor 420 along the stripe height direction undergoes a first magnetic force F1. Portions 454 of the tape media 450 aligned outside of the read sensor 420 along the stripe height direction undergoes second magnetic forces F2 that oppose or is the same as the first magnetic force F1.

FIGS. 4D-4E illustrate schematic views of a read head 490, according to another implementation. FIG. 4D is a schematic isometric MFS view of a read head 490, according to one implementation. FIG. 4E is a schematic isometric side view of the read head 490, according to one implementation. The read head 490 can be used as part of the tape drive 100 (a magnetic storage device) shown in FIG. 1. The read head 490 of FIGS. 4D-4E is similar to the read head 400 of FIGS. 4A-4C. As such, similar reference numerals are used in FIGS. 4A-4C and FIGS. 4D-4E for aspects that are the same in each read head 400, 490.

As shown in FIG. 4D, the read head 490 comprises the same components as the read head 400 of FIGS. 4A-4C, including the plurality of read sensors 420, the plurality of soft bias side shields 410, and the plurality of hard bias side shields 460. However, as shown in FIG. 4E, the lower shield 402 and the lower lead 406 each have the first width W1 in the stripe height direction from the MFS to a first surface 401 opposite the MFS. The second insulation layer 408, the soft bias side shields 410, the hard bias side shields 460, the third insulation layer 440, the read sensors 420, the first insulation layer 412, and the upper shield 404 each have a second width W2 the stripe height direction from the MFS to a second surface 403 opposite the MFS. The first width W1 is greater than the second width W2. In other words, the first surface 401 and the second surface 403 are not aligned.

Furthermore, as discussed and shown above in FIG. 4C, the lower lead 406 has the third thickness T3. The first insulation layer 412, the third insulation layer 440, and the upper leads 416 between the upper shield 404 and hard bias side shields 460 collectively have the fourth thickness T4. The fourth thickness T4 is substantially equal to the third thickness T3 such that a difference between the fourth thickness T4 and the third thickness T3 is about 50 nm or less. The fourth thickness T4 being substantially equal to the third thickness T3 facilitates stabilization of the read sensors 420 by helping to stabilize the soft bias side shields 410, thereby enhancing magnetic reading operations while minimizing signal shunting.

In addition to the third thickness T3 and the fourth thickness T4 being substantially equal, the soft bias side shields 410 of FIGS. 4D-4E having the second width W2 in the stripe height direction less than the first width W1 further stabilizes the soft bias side shields 410 through shape anisotropy. The shape, and resulting shape anisotropy, of the soft bias side shields 410 pins the magnetization of the soft bias side shields 410 in a desired direction, such as in the cross-track direction.

Figure 5:
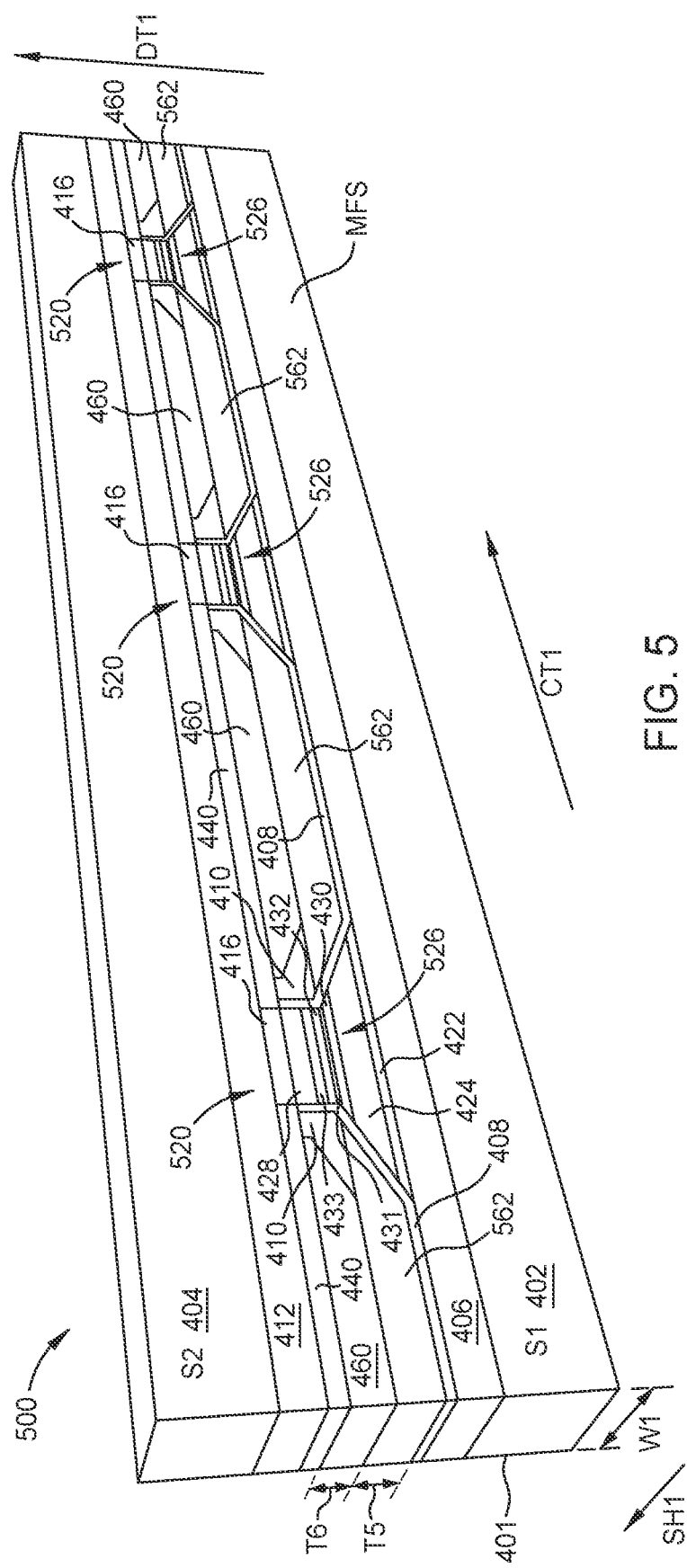
FIGS. 5-11 illustrate various embodiments of read heads, according to various implementations.

FIG. 5 is a schematic isometric MFS view of a read head 500, according to one implementation. The read head 500 can be used as part of the tape drive 100 (a magnetic storage device) shown in FIG. 1. The read head 500 of FIG. 5 is similar to the read head 400 of FIGS. 4A-4C and the read head 490 of FIGS. 4D-4E. As such, similar reference numerals are used in FIGS. 4A-4E and FIG. 5 for aspects that are the same in each read head 400, 490, 500.

While three read sensors 520 are shown in FIG. 5, the read head 500 may comprise any number of read sensors 520, and the number of read sensors 520 is not intended to be limiting. Furthermore, as shown in FIG. 5, the lower lead 406 is common to each read sensor 520 while the upper leads 416 are individual to each read sensor 520. However, in some embodiments, each read sensor 520 may have a separate lower lead 406 (not shown). In other embodiments, the upper lead 416 may be common to each read sensor 520.

Each read sensor 520 of the plurality of read sensors 520 includes a multilayer structure. The multilayer structure of each read sensor 520 includes a buffer layer 422 disposed on the lower lead 406, an AFM layer 424 disposed on the buffer layer 422, and a free layer 526 disposed on the AFM layer 424. Each read sensor 520 includes a cap layer 428 disposed on the free layer 526. The buffer layer 422 is disposed between the AFM layer 424 and the lower lead 406. The cap layer 428 is non-ferromagnetic. Each layer 422, 424, 526, 428 of each read sensor 520 has length in the cross-track direction less than a length in the cross-track direction of the lower shield 402.

The free layer 526 of each read sensor 520 includes a plurality of layers 430-433. The free layer 526 is ferromagnetic. The free layer 526 includes the two layers, the first layer 430 and the second layer 432, separated by the spacer layer 431. The barrier layer 433 of the free layer 526 is disposed between the second layer 432 and the cap layer 428. The lower shield 402, the lower lead 406, the second insulation layer 408, the soft bias side shields 410, the hard bias side shields 460, the third insulation layer 440, the read sensors 520, the first insulation layer 412, and the upper shield 404 each have the first width W1 in the stripe height direction from the MFS to a first surface 401 opposite the MFS.

The read head 500 varies from the read head 400 of FIGS. 4A-4C in that the plurality of soft bias side shields 410 are disposed adjacent to only a portion of the sensors 520. Specifically, the plurality of soft bias side shields 410 are disposed adjacent to only the spacer layer 431, the second layer 432, the barrier layer 433, and the cap layer 428. The second insulation layer 408 is disposed between the plurality of soft bias side shields 410 and the spacer layer 431, the second layer 432, the barrier layer 433, and the cap layer 428. The plurality of hard bias side shields 460 are disposed adjacent to and in contact with the plurality of soft bias side shields 410 in the cross-track direction.

A non-magnetic layer 562 is disposed between the second insulation layer 408 and the plurality of hard bias side shields 460. The non-magnetic layer 562 has a fifth thickness T5 in the down-track direction, and the plurality of hard bias side shields 460 have a sixth thickness T6 in the down-track direction. The fifth thickness T5 may be different or substantially equal to the sixth thickness T6 depending on the various designs.

The soft bias side shields 410 facilitate biasing the magnetic read field of the read sensors 520 during magnetic reading operations. The soft bias side shields 410 facilitate a magnetic field in the cross-track direction during the magnetic reading operations. The plurality of hard bias side shields 460 pin the magnetization of the soft bias side shields 410 in a desired direction, such as in the cross-track direction. The plurality of hard bias side shields 460 stabilize the plurality of soft bias side shields 410 to enhance magnetic reading operations while minimizing signal shunting.

Furthermore, as discussed and shown above in FIG. 4C, the lower lead 406 has the third thickness T3. The first insulation layer 412, the third insulation layer 440, and the upper leads 416 between the upper shield 404 and hard bias side shields 460 and/or the soft bias side shields 410 collectively have the fourth thickness T4. The fourth thickness T4 is substantially equal to the third thickness T3 such that a difference between the fourth thickness T4 and the third thickness T3 is about 50 nm or less. The fourth thickness T4 being substantially equal to the third thickness T3 facilitates stabilization of the read sensors 520 by helping to stabilize the soft bias side shields 410, thereby enhancing magnetic reading operations while minimizing signal shunting.

Figure 6:
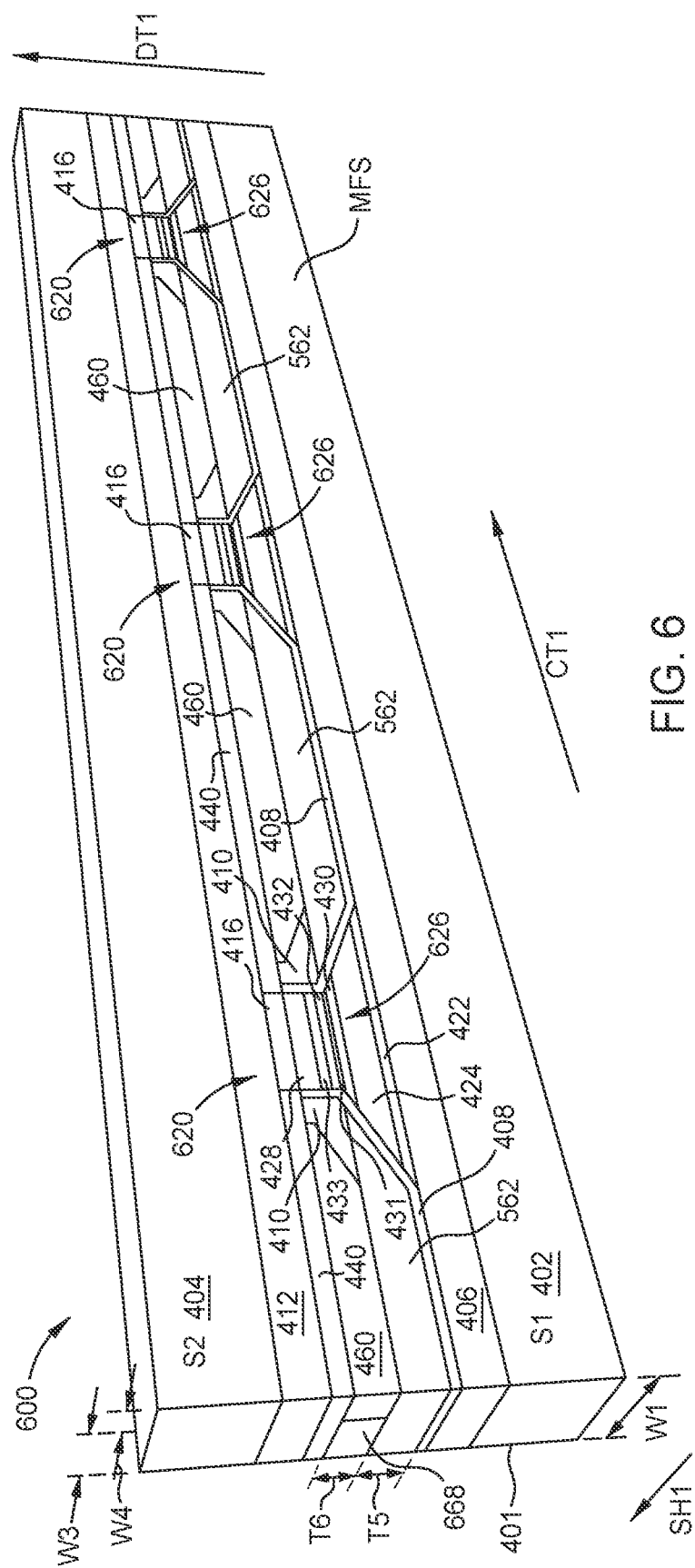

FIG. 6 is a schematic isometric MFS view of a read head 600, according to one implementation. The read head 600 can be used as part of the tape drive 100 (a magnetic storage device) shown in FIG. 1. The read head 600 of FIG. 6 is similar to the read head 400 of FIGS. 4A-4C, the read head 490 of FIGS. 4D-4E, and the read head 500 of FIG. 5. As such, similar reference numerals are used in FIGS. 4A-5 and FIG. 6 for aspects that are the same in each read head 400, 490, 500, 600.

While three read sensors 620 are shown in FIG. 6, the read head 600 may comprise any number of read sensors 620, and the number of read sensors 620 is not intended to be limiting. Furthermore, as shown in FIG. 6, the lower lead 406 is common to each read sensor 620 while the upper leads 416 are individual to each read sensor 620. However, in some embodiments, each read sensor 620 may have a separate lower lead 406 (not shown). In other embodiments, the upper lead 416 may be common to each read sensor 620.

Each read sensor 620 of the plurality of read sensors 620 includes a multilayer structure. The multilayer structure of each read sensor 620 includes a buffer layer 422 disposed on the lower lead 406, an AFM layer 424 disposed on the buffer layer 422, and a free layer 626 disposed on the AFM layer 424. Each read sensor 620 includes a cap layer 428 disposed on the free layer 626. The buffer layer 422 is disposed between the AFM layer 424 and the lower lead 406. The cap layer 428 is non-ferromagnetic. Each layer 422, 424, 626, 428 of each read sensor 620 has length in the cross-track direction less than a length in the cross-track direction of the lower shield 402.

The free layer 626 of each read sensor 620 includes a plurality of layers 430-433. The free layer 626 is ferromagnetic. The free layer 626 includes the two layers, the first layer 430 and the second layer 432, separated by the spacer layer 431. The barrier layer 433 of the free layer 626 is disposed between the second layer 432 and the cap layer 428. The lower shield 402, the lower lead 406, the second insulation layer 408, the non-magnetic layer 562, the third insulation layer 440, the first insulation layer 412, and the upper shield 404 each have the first width W1 in the stripe height direction from the MFS to a first surface 401 opposite the MFS.

The read head 600 is similar to the read head 500 of FIG. 5 in that the plurality of soft bias side shields 410 are disposed adjacent to only a portion of the sensors 620. Specifically, the plurality of soft bias side shields 410 are disposed adjacent to only the spacer layer 431, the second layer 432, the barrier layer 433, and the cap layer 428. The second insulation layer 408 is disposed between the plurality of soft bias side shields 410 and the spacer layer 431, the second layer 432, the barrier layer 433, and the cap layer 428. The plurality of hard bias side shields 460 are disposed adjacent to and in contact with the plurality of soft bias side shields 410 in the cross-track direction.

The non-magnetic layer 562 is disposed between the second insulation layer 408 and the plurality of hard bias side shields 460. The non-magnetic layer 562 has the fifth thickness T5 in the down-track direction, and the plurality of hard bias side shields 460 have the sixth thickness T6 in the down-track direction. The fifth thickness T5 may be different or substantially equal to the sixth thickness T6 depending on the various designs.

The read head 600 varies from the read head 500 of FIG. 5 in that a fourth insulation layer 668 is disposed behind the plurality of hard bias side shields 460. The fourth insulation layer 668 is disposed in contact with the non-magnetic layer 562, the third insulation layer 440, the soft bias side shields 410, the cap layer 428, the barrier layer 433 of the free layer 626, the second layer 432 of the free layer 626, the space layer 431 of the free layer 626, a portion of the second insulation layer 408, and the plurality of hard bias side shields 460. The fourth insulation layer 668 is recessed from the MFS and has a third width W3 in the stripe height direction. The third width W3 is greater than or equal to a fourth width W4 of the plurality of hard bias side shields 460 in the stripe height direction. The fourth insulation layer 668 may comprise the same material as the first insulation layer 412 or a different material.

The soft bias side shields 410 facilitate biasing the magnetic read field of the read sensors 620 during magnetic reading operations. The soft bias side shields 410 facilitate a magnetic field in the cross-track direction during the magnetic reading operations. The plurality of hard bias side shields 460 pin the magnetization of the soft bias side shields 410 in a desired direction, such as in the cross-track direction. The plurality of hard bias side shields 460 stabilize the plurality of soft bias side shields 410 to enhance magnetic reading operations while minimizing signal shunting.

Furthermore, as discussed and shown above in FIG. 4C, the lower lead 406 has the third thickness T3. The first insulation layer 412, the third insulation layer 440, and the upper leads 416 between the upper shield 404 and hard bias side shields 460 and/or the soft bias side shields 410 collectively have the fourth thickness T4. The fourth thickness T4 is substantially equal to the third thickness T3 such that a difference between the fourth thickness T4 and the third thickness T3 is about 50 nm or less. The fourth thickness T4 being substantially equal to the third thickness T3 facilitates stabilization of the read sensors 620 by helping to stabilize the soft bias side shields 410, thereby enhancing magnetic reading operations while minimizing signal shunting.

Figure 7:
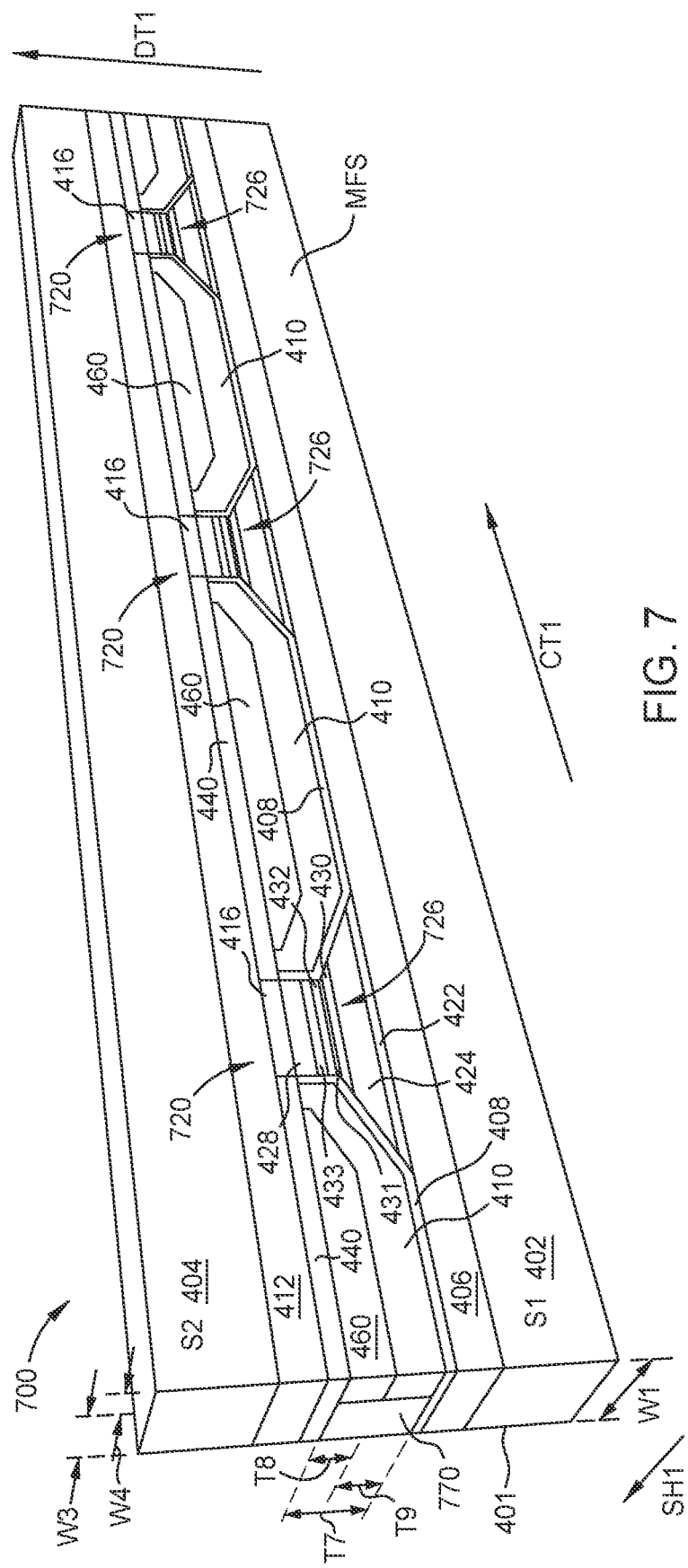

FIG. 7 is a schematic isometric MFS view of a read head 700, according to one implementation. The read head 600 can be used as part of the tape drive 100 (a magnetic storage device) shown in FIG. 1. The read head 700 of FIG. 7 is similar to the read head 400 of FIGS. 4A-4C, the read head 490 of FIGS. 4D-4E, the read head 500 of FIG. 5, and the read head 600 of FIG. 6. As such, similar reference numerals are used in FIGS. 4A-6 and FIG. 7 for aspects that are the same in each read head 400, 490, 500, 600, 700.

While three read sensors 720 are shown in FIG. 7, the read head 700 may comprise any number of read sensors 720, and the number of read sensors 720 is not intended to be limiting. Furthermore, as shown in FIG. 7, the lower lead 406 is common to each read sensor 720 while the upper leads 416 are individual to each read sensor 720. However, in some embodiments, each read sensor 720 may have a separate lower lead 406 (not shown). In other embodiments, the upper lead 416 may be common to each read sensor 720.

Each read sensor 720 of the plurality of read sensors 720 includes a multilayer structure. The multilayer structure of each read sensor 720 includes a buffer layer 422 disposed on the lower lead 406, an AFM layer 424 disposed on the buffer layer 422, and a free layer 726 disposed on the AFM layer 424. Each read sensor 720 includes a cap layer 428 disposed on the free layer 726. The buffer layer 422 is disposed between the AFM layer 424 and the lower lead 406. The cap layer 428 is non-ferromagnetic. Each layer 422, 424, 726, 428 of each read sensor 720 has length in the cross-track direction less than a length in the cross-track direction of the lower shield 402.

The free layer 726 of each read sensor 720 includes a plurality of layers 430-433. The free layer 726 is ferromagnetic. The free layer 726 includes the two layers, the first layer 430 and the second layer 432, separated by the spacer layer 431. The barrier layer 433 of the free layer 726 is disposed between the second layer 432 and the cap layer 428. The lower shield 402, the lower lead 406, the third insulation layer 440, the first insulation layer 412, and the upper shield 404 each have the first width W1 in the stripe height direction from the MFS to a first surface 401 opposite the MFS.

The read head 700 is similar to the read head 400 of FIGS. 4A-4C in that the plurality of soft bias side shields 410 are disposed adjacent to each layer of the sensors 720 on the second insulation layer 408. The plurality of hard bias side shields 460 are disposed on the plurality of soft bias side shields 410 adjacent to the third insulation layer 440. The read head 700 varies from the read head 400 of FIGS. 4A-4C in that a fifth insulation layer 770 is disposed behind the plurality of hard bias side shields 460, the plurality of soft bias side shields 410, the sensors 720, and the second insulation layer 408. The fifth insulation layer 770 is disposed in contact with the lower lead 406 and the third insulation layer 440. The fifth insulation layer 770 is recessed from the MFS and has the third width W3 in the stripe height direction. The plurality of hard bias side shields 460, the plurality of soft bias side shields 410, and the read sensors 720 each have the fourth width W4 in the stripe height direction. The third width W3 is greater than or equal to the fourth width W4 in the stripe height direction.

The fifth insulation layer 770 further has a seventh thickness T7 in the down-track direction. The plurality of hard bias side shields 460 have an eighth thickness T8 in the down-track direction, and the plurality of soft bias side shields 410 have a ninth thickness T9 in the down-track direction. The seventh thickness T7 is greater than the eighth thickness T8 and the ninth thickness T9. The fifth insulation layer 770 may comprise the same material as the first insulation layer 412 or a different material.

The soft bias side shields 410 facilitate biasing the magnetic read field of the read sensors 720 during magnetic reading operations. The soft bias side shields 410 facilitate a magnetic field in the cross-track direction during the magnetic reading operations. The plurality of hard bias side shields 460 pin the magnetization of the soft bias side shields 410 in a desired direction, such as in the cross-track direction. The plurality of hard bias side shields 460 stabilize the plurality of soft bias side shields 410 to enhance magnetic reading operations while minimizing signal shunting.

Furthermore, as discussed and shown above in FIG. 4C, the lower lead 406 has the third thickness T3. The first insulation layer 412, the third insulation layer 440, and the upper leads 416 between the upper shield 404 and hard bias side shields 460 collectively have the fourth thickness T4. The fourth thickness T4 is substantially equal to the third thickness T3 such that a difference between the fourth thickness T4 and the third thickness T3 is about 50 nm or less. The fourth thickness T4 being substantially equal to the third thickness T3 facilitates stabilization of the read sensors 720 by helping to stabilize the soft bias side shields 410, thereby enhancing magnetic reading operations while minimizing signal shunting.

Figure 8:
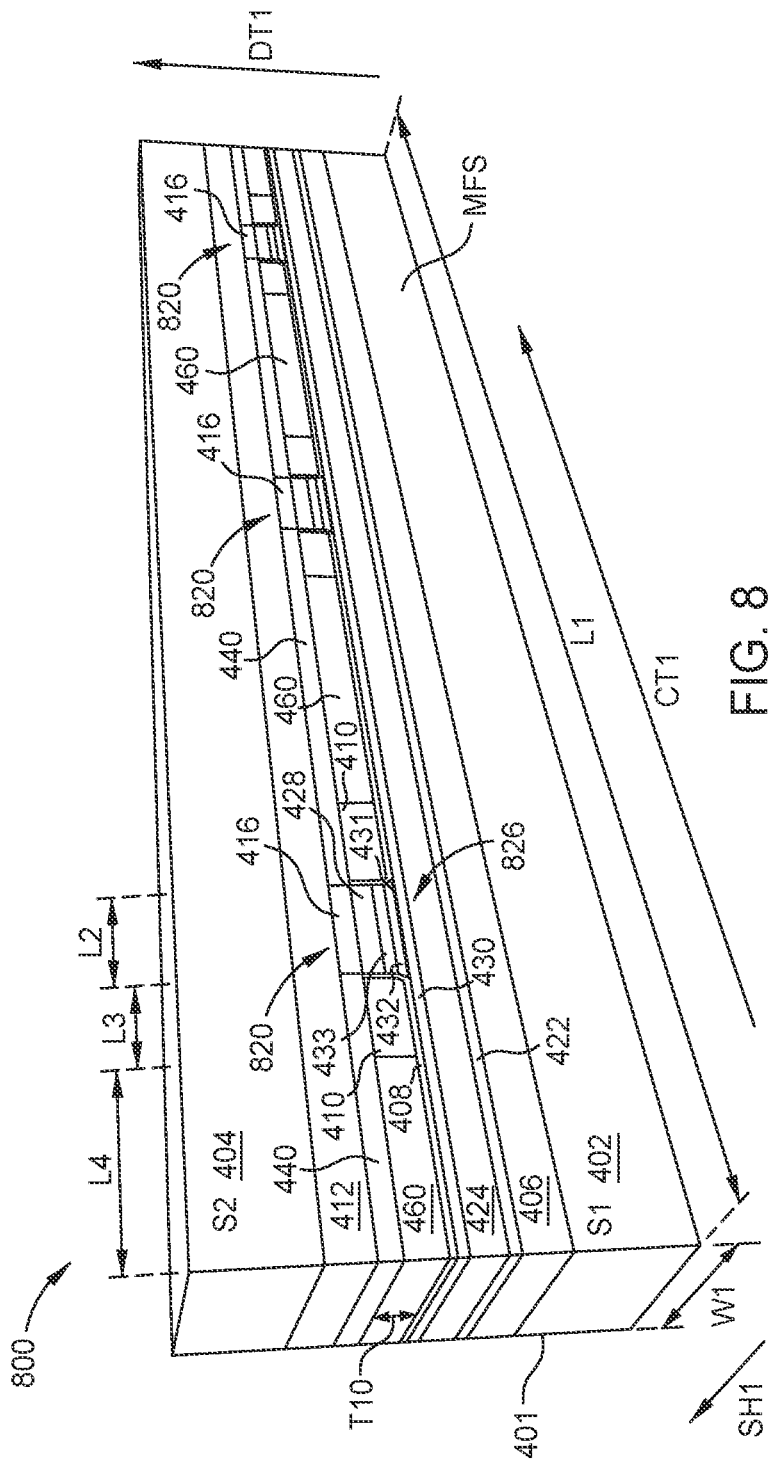

FIG. 8 is a schematic isometric MFS view of a read head 800, according to one implementation. The read head 800 can be used as part of the tape drive 100 (a magnetic storage device) shown in FIG. 1. The read head 800 of FIG. 8 is similar to the read head 400 of FIGS. 4A-4C, the read head 490 of FIGS. 4D-4E, the read head 500 of FIG. 5, the read head 600 of FIG. 6, and the read head 700 of FIG. 7. As such, similar reference numerals are used in FIGS. 4A-7 and FIG. 8 for aspects that are the same in each read head 400, 490, 500, 600, 700 800.

While three read sensors 820 are shown in FIG. 8, the read head 800 may comprise any number of read sensors 820, and the number of read sensors 820 is not intended to be limiting. Furthermore, as shown in FIG. 8, the lower lead 406 is common to each read sensor 820 while the upper leads 416 are individual to each read sensor 820. However, in some embodiments, each read sensor 820 may have a separate lower lead 406 (not shown). In other embodiments, the upper lead 416 may be common to each read sensor 820.

Each read sensor 820 of the plurality of read sensors 820 includes a multilayer structure. The multilayer structure of each read sensor 820 includes a buffer layer 422 disposed on the lower lead 406, an AFM layer 424 disposed on the buffer layer 422, and a free layer 826 disposed on the AFM layer 424. Each read sensor 420 includes a cap layer 428 disposed on the free layer 826. The buffer layer 422 is disposed between the AFM layer 424 and the lower lead 406. The cap layer 428 is non-ferromagnetic. The buffer layer 422 and the AFM layer 424 are common to each sensor 820. Stated otherwise, each sensor 820 comprises a portion of the buffer layer 422 and a portion of the AFM layer 424 such that the collective portions of the buffer layer 422 and the collective portions of the AFM layer 424 span the plurality of read sensors 820.

The free layer 826 of each read sensor 820 includes a plurality of layers 430-433. The free layer 826 is ferromagnetic. The free layer 826 includes the two layers, the first layer 430 and the second layer 432, separated by the spacer layer 431. The barrier layer 433 of the free layer 826 is disposed between the second layer 432 and the cap layer 428. The lower shield 402, the lower lead 406, the second insulation layer 408, the soft bias side shields 410, the hard bias side shields 460, the third insulation layer 440, the read sensors 820, the first insulation layer 412, and the upper shield 404 each have the first width W1 in the stripe height direction from the MFS to a first surface 401 opposite the MFS. The second insulation layer 408 is disposed on the first layer 430 of the free layer 826 and surrounding each of the read sensors 820 in the down-track direction.

The read head 800 varies from the read heads 400, 490, 500 in that each free layer 826 of each read sensor 820 shares a common first layer 430, while each read sensor 820 has its own individual spacer layer 431, second layer 432, and barrier layer 433. Stated otherwise, each sensor 820 comprises a portion of the first layer 430 such that the collective portions of the first layer 430 span the plurality of read sensors 820.

Additionally, similar to the read head 500 of FIG. 5, the plurality of soft bias side shields 410 are disposed adjacent to only a portion of the sensors 820. Specifically, the plurality of soft bias side shields 410 are disposed adjacent to only the spacer layer 431, the second layer 432, the barrier layer 433, and the cap layer 428. The second insulation layer 408 is disposed between the plurality of soft bias side shields 410 and the spacer layer 431, the second layer 432, the barrier layer 433, and the cap layer 428. The plurality of hard bias side shields 460 are disposed adjacent to and in contact with the plurality of soft bias side shields 410 in the cross-track direction. Both the plurality of soft bias side shields 410 and the plurality of hard bias side shields 460 have a tenth thickness T10 in the down-track direction.

The lower shield 402, the lower lead 406, the third insulation layer 440, the first layer 430, the first insulation layer 412, and the upper shield 404 each have the first length L1 in the cross-track direction. The spacer layer 431, the second layer 432, the barrier layer 433, the cap layer 428, and the upper leads 416 each have a second length L2 in the cross-track direction less than the first length L1. The plurality of soft bias side shields 410 each have a third length L3 in the cross-track direction, and the plurality of hard bias side shields 460 each have a fourth length L4 in the cross-track direction substantially equal or greater than the third length L3. The fourth length L4 is less than the first length L1. The second insulation layer 408 has a length in the cross-track direction substantially equal to the third length L3 and the fourth length L4 collectively.

The soft bias side shields 410 facilitate biasing the magnetic read field of the read sensors 820 during magnetic reading operations. The soft bias side shields 410 facilitate a magnetic field in the cross-track direction during the magnetic reading operations. The plurality of hard bias side shields 460 pin the magnetization of the soft bias side shields 410 in a desired direction, such as in the cross-track direction. The plurality of hard bias side shields 460 stabilize the plurality of soft bias side shields 410 to enhance magnetic reading operations while minimizing signal shunting.

Furthermore, as discussed and shown above in FIG. 4C, the lower lead 406 has the third thickness T3. The first insulation layer 412, the third insulation layer 440, and the upper leads 416 between the upper shield 404 and hard bias side shields 460 collectively have the fourth thickness T4. The fourth thickness T4 is substantially equal to the third thickness T3 such that a difference between the fourth thickness T4 and the third thickness T3 is about 50 nm or less. The fourth thickness T4 being substantially equal to the third thickness T3 facilitates stabilization of the read sensors 820 by helping to stabilize the soft bias side shields 410, thereby enhancing magnetic reading operations while minimizing signal shunting.

Figure 9:
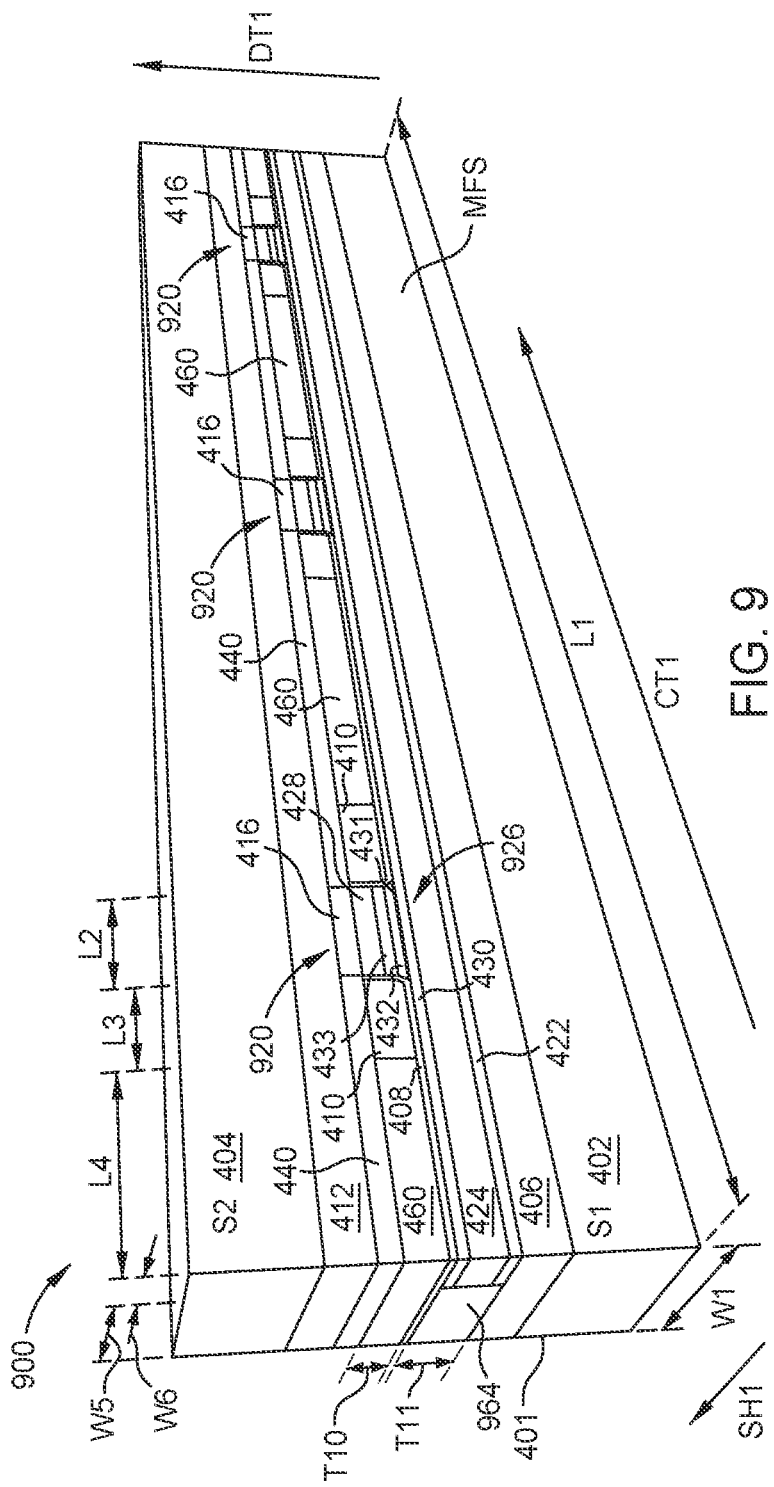

FIG. 9 is a schematic isometric MFS view of a read head 900, according to one implementation. The read head 900 can be used as part of the tape drive 100 (a magnetic storage device) shown in FIG. 1. The read head 900 of FIG. 9 is similar to the read head 400 of FIGS. 4A-4C, the read head 490 of FIGS. 4D-4E, the read head 500 of FIG. 5, the read head 600 of FIG. 6, and the read head 700 of FIG. 7, and the read head 800 of FIG. 8. As such, similar reference numerals are used in FIGS. 4A-8 and FIG. 9 for aspects that are the same in each read head 400, 490, 500, 600, 700, 800, 900.

While three read sensors 920 are shown in FIG. 9, the read head 900 may comprise any number of read sensors 920, and the number of read sensors 920 is not intended to be limiting. Furthermore, as shown in FIG. 9, the lower lead 406 is common to each read sensor 920 while the upper leads 416 are individual to each read sensor 920. However, in some embodiments, each read sensor 920 may have a separate lower lead 406 (not shown). In other embodiments, the upper lead 416 may be common to each read sensor 920.

Each read sensor 920 of the plurality of read sensors 920 includes a multilayer structure. The multilayer structure of each read sensor 920 includes a buffer layer 422 disposed on the lower lead 406, an AFM layer 424 disposed on the buffer layer 422, and a free layer 926 disposed on the AFM layer 424. Each read sensor 420 includes a cap layer 428 disposed on the free layer 926. The buffer layer 422 is disposed between the AFM layer 424 and the lower lead 406. The cap layer 428 is non-ferromagnetic. The buffer layer 422 and the AFM layer 424 are common to each sensor 920. Stated otherwise, each sensor 920 comprises a portion of the buffer layer 422 and a portion of the AFM layer 424 such that the collective portions of the buffer layer 422 and the collective portions of the AFM layer 424 span the plurality of read sensors 920.

The free layer 926 of each read sensor 920 includes a plurality of layers 430-433. The free layer 926 is ferromagnetic. The free layer 926 includes the two layers, the first layer 430 and the second layer 432, separated by the spacer layer 431. The barrier layer 433 of the free layer 926 is disposed between the second layer 432 and the cap layer 428. The lower shield 402, the lower lead 406, the second insulation layer 408, the third insulation layer 440, the first insulation layer 412, and the upper shield 404 each have the first width W1 in the stripe height direction from the MFS to a first surface 401 opposite the MFS.

The read head 900 is similar to the read head 800 of FIG. 8 in that each free layer 926 of each read sensor 920 shares a common first layer 430, while each read sensor 920 has its own individual spacer layer 431, second layer 432, and barrier layer 433. Stated otherwise, each sensor 920 comprises a portion of the first layer 430 such that the collective portions of the first layer 430 span the plurality of read sensors 920. The second insulation layer 408 is disposed on the first layer 430 of the free layer 926 and surrounding each of the read sensors 920 in the down-track direction.

Additionally, similar to the read head 500 of FIG. 5 and the read head 800 of FIG. 8, the plurality of soft bias side shields 410 are disposed adjacent to only a portion of the sensors 920. Specifically, the plurality of soft bias side shields 410 are disposed adjacent to only the spacer layer 431, the second layer 432, the barrier layer 433, and the cap layer 428. The second insulation layer 408 is disposed between the plurality of soft bias side shields 410 and the spacer layer 431, the second layer 432, the barrier layer 433, and the cap layer 428. The plurality of hard bias side shields 460 are still disposed adjacent to and in contact with the plurality of soft bias side shields 410 in the cross-track direction. Both the plurality of soft bias side shields 410 and the plurality of hard bias side shields 460 have a tenth thickness T10 in the down-track direction.

The read head 900 varies from the read head 800 of FIG. 8 in that a sixth insulation layer 964 is disposed between the second insulation layer 408 and the lower leads 406 on the backside of the read head 900 (away from the MFS). The sixth insulation layer 964 may comprise the same material as the first insulation layer 412 or a different material. Additionally, the sixth insulation layer 964 has a fifth width W5 in the stripe height direction and an eleventh thickness T11 in the down-track direction. The buffer layer 422, the AFM layer 424, and the first layer 430 have a sixth width W6 in the stripe height direction. The fifth width W5 may be greater than or equal to the sixth width W6. The fifth width W5 and the sixth width W6 collectively equal the first width W1 of the lower shield 402, the lower lead 406, the plurality of hard bias side shields 460, the first, second, and third insulation layers 412, 408, 440, and the upper shield 404. The eleventh thickness T11 is greater than or equal to the tenth thickness T10.

The lower shield 402, the lower lead 406, the third insulation layer 440, the first layer 430, the first insulation layer 412, and the upper shield 404 each have the first length L1 in the cross-track direction. The spacer layer 431, the second layer 432, the barrier layer 433, the cap layer 428, and the upper leads 416 each have a second length L2 in the cross-track direction less than the first length L1. The plurality of soft bias side shields 410 each have a third length L3 in the cross-track direction, and the plurality of hard bias side shields 460 each have a fourth length L4 in the cross-track direction substantially equal or greater than the third length L3. The fourth length L4 is less than the first length L1. The second insulation layer 408 has a length in the cross-track direction substantially equal to the third length L3 and the fourth length L4 collectively.

The soft bias side shields 410 facilitate biasing the magnetic read field of the read sensors 920 during magnetic reading operations. The soft bias side shields 410 facilitate a magnetic field in the cross-track direction during the magnetic reading operations. The plurality of hard bias side shields 460 pin the magnetization of the soft bias side shields 410 in a desired direction, such as in the cross-track direction. The plurality of hard bias side shields 460 stabilize the plurality of soft bias side shields 410 to enhance magnetic reading operations while minimizing signal shunting.

Furthermore, as discussed and shown above in FIG. 4C, the lower lead 406 has the third thickness T3. The first insulation layer 412, the third insulation layer 440, and the upper leads 416 between the upper shield 404 and hard bias side shields 460 collectively have the fourth thickness T4. The fourth thickness T4 is substantially equal to the third thickness T3 such that a difference between the fourth thickness T4 and the third thickness T3 is about 50 nm or less. The fourth thickness T4 being substantially equal to the third thickness T3 facilitates stabilization of the read sensors 920 by helping to stabilize the soft bias side shields 410, thereby enhancing magnetic reading operations while minimizing signal shunting.

Figure 10:
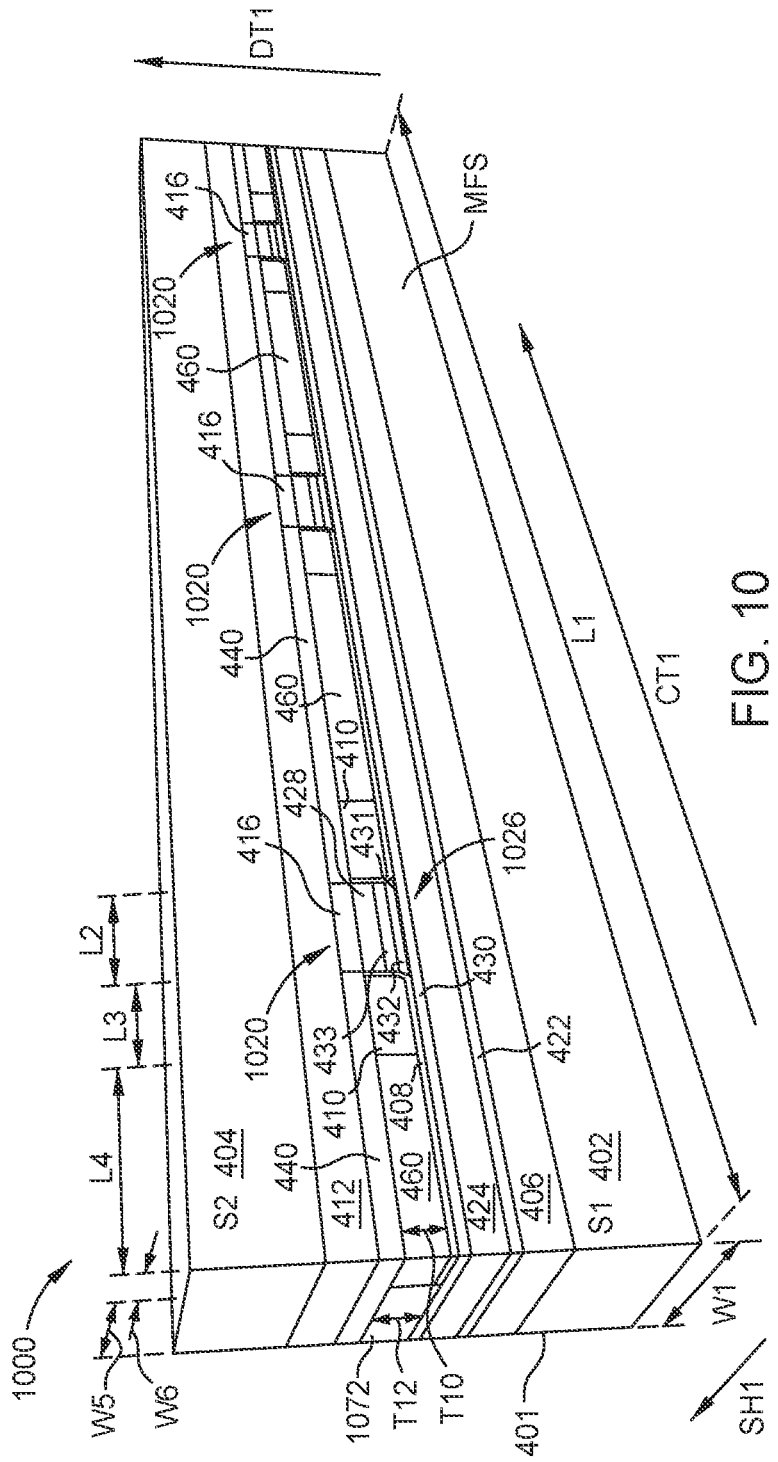

FIG. 10 is a schematic isometric MFS view of a read head 1000, according to one implementation. The read head 1000 can be used as part of the tape drive 100 (a magnetic storage device) shown in FIG. 1. The read head 1000 of FIG. 10 is similar to the read head 400 of FIGS. 4A-4C, the read head 490 of FIGS. 4D-4E, the read head 500 of FIG. 5, the read head 600 of FIG. 6, and the read head 700 of FIG. 7, the read head 800 of FIG. 8, and the read head 900 of FIG. 9. As such, similar reference numerals are used in FIGS. 4A-9 and FIG. 10 for aspects that are the same in each read head 400, 490, 500, 600, 700, 800, 900, 1000.

While three read sensors 1020 are shown in FIG. 10, the read head 1000 may comprise any number of read sensors 1020, and the number of read sensors 1020 is not intended to be limiting. Furthermore, as shown in FIG. 10, the lower lead 406 is common to each read sensor 1020 while the upper leads 416 are individual to each read sensor 1020. However, in some embodiments, each read sensor 1020 may have a separate lower lead 406 (not shown). In other embodiments, the upper lead 416 may be common to each read sensor 1020.

Each read sensor 1020 of the plurality of read sensors 1020 includes a multilayer structure. The multilayer structure of each read sensor 1020 includes a buffer layer 422 disposed on the lower lead 406, an AFM layer 424 disposed on the buffer layer 422, and a free layer 1026 disposed on the AFM layer 424. Each read sensor 420 includes a cap layer 428 disposed on the free layer 1026. The buffer layer 422 is disposed between the AFM layer 424 and the lower lead 406. The cap layer 428 is non-ferromagnetic. The buffer layer 422 and the AFM layer 424 are common to each sensor 1020. Stated otherwise, each sensor 1020 comprises a portion of the buffer layer 422 and a portion of the AFM layer 424 such that the collective portions of the buffer layer 422 and the collective portions of the AFM layer 424 span the plurality of read sensors 1020.

The free layer 1026 of each read sensor 1020 includes a plurality of layers 430-433. The free layer 1026 is ferromagnetic. The free layer 1026 includes the two layers, the first layer 430 and the second layer 432, separated by the spacer layer 431. The barrier layer 433 of the free layer 1026 is disposed between the second layer 432 and the cap layer 428. The lower shield 402, the lower lead 406, the buffer layer 422, the AFM layer 424, the first layer 430, the third insulation layer 440, the first insulation layer 412, and the upper shield 404 each have the first width W1 in the stripe height direction from the MFS to a first surface 401 opposite the MFS.

The read head 1000 is similar to the read heads 800 and 900 of FIGS. 8 and 9 in that each free layer 1026 of each read sensor 1020 shares a common first layer 430, while each read sensor 1020 has its own individual spacer layer 431, second layer 432, and barrier layer 433. Stated otherwise, each sensor 1020 comprises a portion of the first layer 430 such that the collective portions of the first layer 430 span the plurality of read sensors 1020. The second insulation layer 408 is disposed on the first layer 430 of the free layer 1026 and surrounding each of the read sensors 1020 in the down-track direction.

Additionally, similar to the read heads 500, 600, 800, and 900 of FIGS. 5, 6, 8, and 9, the plurality of soft bias side shields 410 are disposed adjacent to only a portion of the sensors 1020. Specifically, the plurality of soft bias side shields 410 are disposed adjacent to only the spacer layer 431, the second layer 432, the barrier layer 433, and the cap layer 428. The second insulation layer 408 is disposed between the plurality of soft bias side shields 410 and the spacer layer 431, the second layer 432, the barrier layer 433, and the cap layer 428. The plurality of hard bias side shields 460 are still disposed adjacent to and in contact with the plurality of soft bias side shields 410 in the cross-track direction. Both the plurality of soft bias side shields 410 and the plurality of hard bias side shields 460 have the tenth thickness T10 in the down-track direction.

The read head 1000 varies from the read head 800 of FIG. 8 in that a seventh insulation layer 1072 is disposed between the first layer 430 and third insulation layer 440 on the backside of the read head 1000 recessed from the MFS. The seventh insulation layer 1072 may comprise the same material as the first insulation layer 412 or a different material. Additionally, the seventh insulation layer 1072 has the fifth width W5 in the stripe height direction and a twelfth thickness T12 in the down-track direction. The second insulation layer 408, the soft bias side shields 410, and the hard bias side shields 460 each have the sixth width W6 in the stripe height direction. The fifth width W5 may be greater than or equal to the sixth width W6. The fifth width W5 and the sixth width W6 collectively equal the first width W1 of the lower shield 402, the lower lead 406, the buffer layer 422, the AFM layer 424, the first layer 430, the first insulation layer 412, the third insulation layer 440, and the upper shield 404. The twelfth thickness T12 is greater than or equal to the tenth thickness T10.

The lower shield 402, the lower lead 406, the third insulation layer 440, the first layer 430, the first insulation layer 412, and the upper shield 404 each have the first length L1 in the cross-track direction. The spacer layer 431, the second layer 432, the barrier layer 433, the cap layer 428, and the upper leads 416 each have a second length L2 in the cross-track direction less than the first length L1. The plurality of soft bias side shields 410 each have a third length L3 in the cross-track direction, and the plurality of hard bias side shields 460 each have a fourth length L4 in the cross-track direction substantially equal or greater than the third length L3. The fourth length L4 is less than the first length L1. The second insulation layer 408 has a length in the cross-track direction substantially equal to the third length L3 and the fourth length L4 collectively.

The soft bias side shields 410 facilitate biasing the magnetic read field of the read sensors 920 during magnetic reading operations. The soft bias side shields 410 facilitate a magnetic field in the cross-track direction during the magnetic reading operations. The plurality of hard bias side shields 460 pin the magnetization of the soft bias side shields 410 in a desired direction, such as in the cross-track direction. The plurality of hard bias side shields 460 stabilize the plurality of soft bias side shields 410 to enhance magnetic reading operations while minimizing signal shunting.

Furthermore, as discussed and shown above in FIG. 4C, the lower lead 406 has the third thickness T3. The first insulation layer 412, the third insulation layer 440, and the upper leads 416 between the upper shield 404 and hard bias side shields 460 collectively have the fourth thickness T4. The fourth thickness T4 is substantially equal to the third thickness T3 such that a difference between the fourth thickness T4 and the third thickness T3 is about 50 nm or less. The fourth thickness T4 being substantially equal to the third thickness T3 facilitates stabilization of the read sensors 1020 by helping to stabilize the soft bias side shields 410, thereby enhancing magnetic reading operations while minimizing signal shunting.

Figure 11:
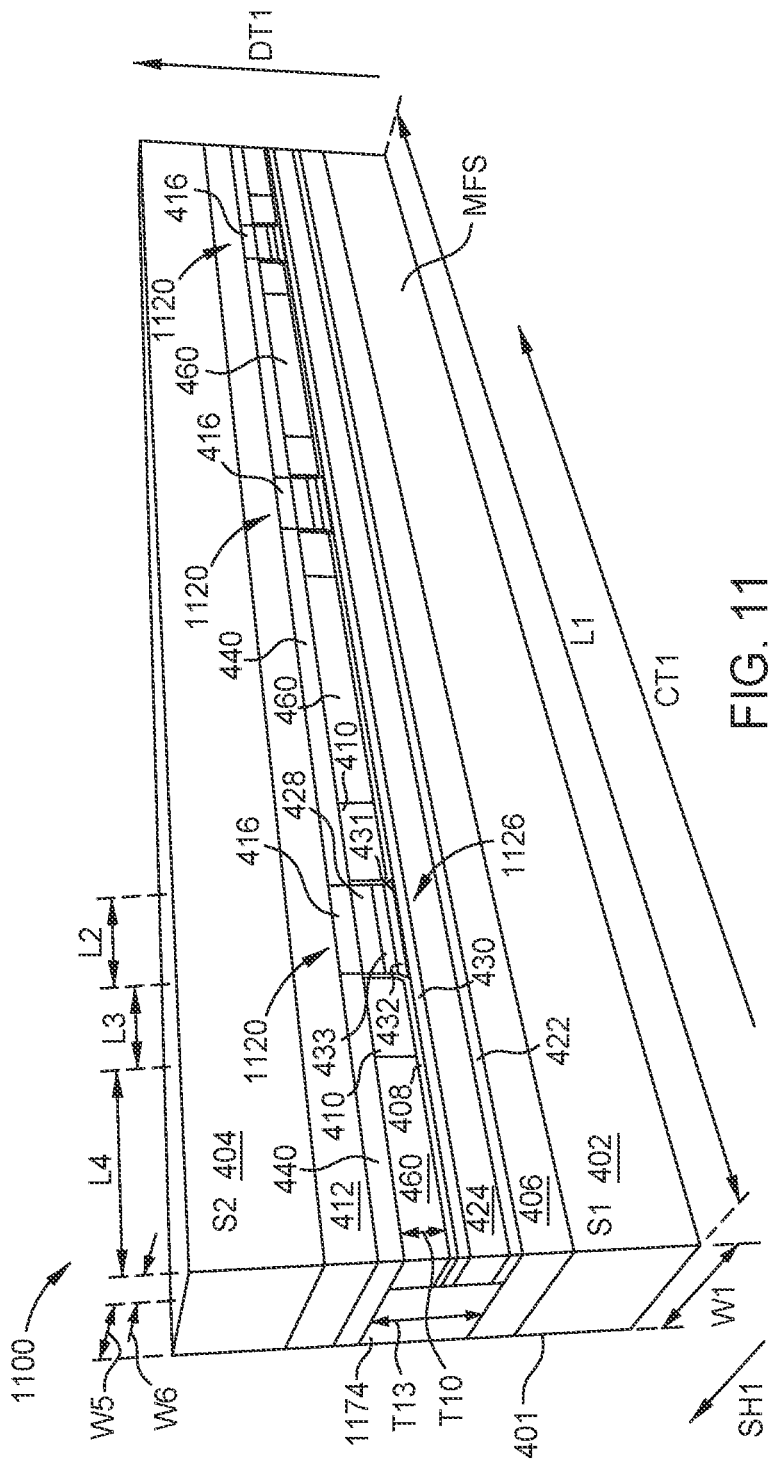

FIG. 11 is a schematic isometric MFS view of a read head 1100, according to one implementation. The read head 1100 can be used as part of the tape drive 100 (a magnetic storage device) shown in FIG. 1. The read head 1100 of FIG. 11 is similar to the read head 400 of FIGS. 4A-4C, the read head 490 of FIGS. 4D-4E, the read head 500 of FIG. 5, the read head 600 of FIG. 6, and the read head 700 of FIG. 7, the read head 800 of FIG. 8, the read head 900 of FIG. 9, and the read head 1000 of FIG. 10. As such, similar reference numerals are used in FIGS. 4A-10 and FIG. 11 for aspects that are the same in each read head 400, 490, 500, 600, 700, 800, 900, 1000, 1100. Moreover, each read head 400, 490, 500, 600, 700, 800, 900, 1000, 1100 of FIGS. 4A-11 may be used in combination with one another.

While three read sensors 1120 are shown in FIG. 11, the read head 1100 may comprise any number of read sensors 1120, and the number of read sensors 1120 is not intended to be limiting. Furthermore, as shown in FIG. 11, the lower lead 406 is common to each read sensor 1120 while the upper leads 416 are individual to each read sensor 1120. However, in some embodiments, each read sensor 1120 may have a separate lower lead 406 (not shown). In other embodiments, the upper lead 416 may be common to each read sensor 1120.

Each read sensor 1120 of the plurality of read sensors 1120 includes a multilayer structure. The multilayer structure of each read sensor 1120 includes a buffer layer 422 disposed on the lower lead 406, an AFM layer 424 disposed on the buffer layer 422, and a free layer 1126 disposed on the AFM layer 424. Each read sensor 420 includes a cap layer 428 disposed on the free layer 1126. The buffer layer 422 is disposed between the AFM layer 424 and the lower lead 406. The cap layer 428 is non-ferromagnetic. The buffer layer 422 and the AFM layer 424 are common to each sensor 1120. Stated otherwise, each sensor 1120 comprises a portion of the buffer layer 422 and a portion of the AFM layer 424 such that the collective portions of the buffer layer 422 and the collective portions of the AFM layer 424 span the plurality of read sensors 1010.

The free layer 1126 of each read sensor 1120 includes a plurality of layers 430-433. The free layer 1126 is ferromagnetic. The free layer 1126 includes the two layers, the first layer 430 and the second layer 432, separated by the spacer layer 431. The barrier layer 433 of the free layer 1126 is disposed between the second layer 432 and the cap layer 428. The lower shield 402, the lower lead 406, the third insulation layer 440, the first insulation layer 412, and the upper shield 404 each have the first width W1 in the stripe height direction from the MFS to a first surface 401 opposite the MFS.

The read head 1100 is similar to the read heads 800, 900, and 1000 of FIGS. 8-10 in that each free layer 1126 of each read sensor 1120 shares a common first layer 430, while each read sensor 1120 has its own individual spacer layer 431, second layer 432, and barrier layer 433. Stated otherwise, each sensor 1120 comprises a portion of the first layer 430 such that the collective portions of the first layer 430 span the plurality of read sensors 1120. The second insulation layer 408 is disposed on the first layer 430 of the free layer 1126 and surrounding each of the read sensors 1120 in the down-track direction.

Additionally, similar to the read heads 500, 600, 800, 900, and 10 of FIGS. 5, 6, and 8-10, the plurality of soft bias side shields 410 are disposed adjacent to only a portion of the sensors 1120. Specifically, the plurality of soft bias side shields 410 are disposed adjacent to only the spacer layer 431, the second layer 432, the barrier layer 433, and the cap layer 428. The second insulation layer 408 is disposed between the plurality of soft bias side shields 410 and the spacer layer 431, the second layer 432, the barrier layer 433, and the cap layer 428. The plurality of hard bias side shields 460 are still disposed adjacent to and in contact with the plurality of soft bias side shields 410 in the cross-track direction. Both the plurality of soft bias side shields 410 and the plurality of hard bias side shields 460 have the tenth thickness T10 in the down-track direction.

The read head 1100 varies from the read head 800 of FIG. 8 in that an eighth insulation layer 1174 is disposed between the lower lead 406 and the third insulation layer 440 on the backside of the read head 1100 recessed from the MFS. The eighth insulation layer 1174 may comprise the same material as the first insulation layer 412 or a different material. Additionally, the eighth insulation layer 1174 has the fifth width W5 in the stripe height direction and an thirteenth thickness T13 in the down-track direction. The thirteenth thickness T13 is greater than tenth thickness T10. The buffer layer 422, the AFM layer 424, the first layer 430, the second insulation layer 408, the soft bias side shields 410, the hard bias side shields 460, and the sensors 1120 each have the sixth width W6 in the stripe height direction. The fifth width W5 may be greater than or equal to the sixth width W6. The fifth width W5 and the sixth width W6 collectively equal the first width W1 of the lower shield 402, the lower lead 406, the first insulation layer 412, the third insulation layer 440, and the upper shield 404.

The lower shield 402, the lower lead 406, the third insulation layer 440, the first layer 430, the first insulation layer 412, and the upper shield 404 each have the first length L1 in the cross-track direction. The spacer layer 431, the second layer 432, the barrier layer 433, the cap layer 428, and the upper leads 416 each have a second length L2 in the cross-track direction less than the first length L1. The plurality of soft bias side shields 410 each have a third length L3 in the cross-track direction, and the plurality of hard bias side shields 460 each have a fourth length L4 in the cross-track direction substantially equal or greater than the third length L3. The fourth length L4 is less than the first length L1. The second insulation layer 408 has a length in the cross-track direction substantially equal to the third length L3 and the fourth length L4 collectively.

The soft bias side shields 410 facilitate biasing the magnetic read field of the read sensors 920 during magnetic reading operations. The soft bias side shields 410 facilitate a magnetic field in the cross-track direction during the magnetic reading operations. The plurality of hard bias side shields 460 pin the magnetization of the soft bias side shields 410 in a desired direction, such as in the cross-track direction. The plurality of hard bias side shields 460 stabilize the plurality of soft bias side shields 410 to enhance magnetic reading operations while minimizing signal shunting.

Furthermore, as discussed and shown above in FIG. 4C, the lower lead 406 has the third thickness T3. The first insulation layer 412, the third insulation layer 440, and the upper leads 416 between the upper shield 404 and hard bias side shields 460 collectively have the fourth thickness T4. The fourth thickness T4 is substantially equal to the third thickness T3 such that a difference between the fourth thickness T4 and the third thickness T3 is about 50 nm or less. The fourth thickness T4 being substantially equal to the third thickness T3 facilitates stabilization of the read sensors 1120 by helping to stabilize the soft bias side shields 410, thereby enhancing magnetic reading operations while minimizing signal shunting.

Therefore, utilizing hard bias side shields to stabilize soft bias side shields disposed between and outwardly of the plurality of read sensors in read heads facilitates biasing of the magnetic read field of the read sensors during magnetic reading operations. As such, the stabilized soft bias shields enable a magnetic field in the cross-track direction during the magnetic reading operations while minimizing signal shunting, resulting in improved magnetic reading operations in read heads.

In one embodiment, a read head comprises a lower shield, an upper shield, one or more lower leads disposed over the lower shield, one or more upper leads disposed between the one or more lower leads and the upper shield, a plurality of read sensors disposed between the one or more lower leads and the one or more upper leads at a media facing surface, each read sensor of the plurality of read sensors comprising a multilayer structure, a plurality of soft bias side shields disposed between and outwardly of the plurality of read sensors, and a plurality of hard bias side shields disposed on and in contact with the plurality of soft bias side shields.

The plurality of soft bias side shields have a first width in a stripe height direction and the lower shield has a second width in the stripe height direction greater than the first width. The plurality of soft bias side shields have a first width in a stripe height direction and the lower shield has a second width in the stripe height direction substantially equal to the first width. The plurality of soft bias side shields have a first thickness in a down-track direction and the plurality of hard bias side shields have a second thickness in the down-track direction, the second thickness being different than or substantially equal to the first thickness. The read head further comprises a non-magnetic layer disposed between the one or more lower leads and the plurality of soft bias side shields. The non-magnetic layer is disposed between and in contact with the plurality of soft bias side shields and a first insulation layer. A magnetic storage device comprises the read head.

In another embodiment, a read head comprises a lower shield, a lower lead disposed over the lower shield, an antiferromagnetic (AFM) layer disposed over the lower lead, a first layer disposed on the AFM layer, and a plurality of read sensors disposed over the first layer at a media facing surface (MFS), each read sensor of the plurality of read sensors comprising a multilayer structure, the multilayer structure comprising: a portion of the AFM layer and a portion of the first layer. The read head further comprises a plurality of soft bias side shields disposed between and outwardly of the plurality of read sensors, a plurality of hard bias side shields disposed in contact with the plurality of soft bias side shields, one or more upper leads disposed over the plurality of read sensors, and an upper shield disposed over the one or more upper leads.

The AFM layer and the first layer each individually have a first width in a stripe height direction. The plurality of soft bias side shields and the plurality of hard bias side shields each individually have a second width in the stripe height direction. The first width is substantially equal to the second width. The first width is greater than the second width. The first width is less than the second width. The multilayer structure further comprises a buffer layer, a second layer disposed over the buffer layer, a barrier layer disposed over the second layer, and a cap layer disposed over the barrier layer. The plurality of soft bias side shields are disposed adjacent to and outwardly of the second layer, the barrier layer, and the cap layer. A magnetic storage device comprises the read head.

In yet another embodiment, a read head comprises a lower shield, an upper shield, one or more lower leads disposed over the lower shield, one or more upper leads disposed between the one or more lower leads and the upper shield, and a plurality of read sensors disposed between the one or more lower leads and the one or more upper leads at a media facing surface, each read sensor of the plurality of read sensors comprising a multilayer structure, the multilayer structure comprising: a buffer layer, an AFM layer disposed over the buffer layer, a free layer disposed over the AFM layer, the free layer comprising a first layer and a second layer, a barrier layer disposed over the free layer, and a cap layer disposed over the barrier layer. The read head further comprises a plurality of soft bias side shields disposed adjacent to and outwardly of the second layer, the barrier layer, and the cap layer of each read sensor, and a plurality of hard bias side shields disposed on and in contact with the plurality of soft bias side shields.

The read head further comprises a non-magnetic layer disposed between the one or more lower leads and the plurality of soft bias side shields and between the one or more lower leads and the plurality of hard bias side shields. The non-magnetic layer is disposed adjacent to and outwardly of the buffer layer, the AFM layer, and the first layer of each read sensor. The plurality of hard bias side shields has a first thickness in a down-track direction and the non-magnetic layer has a second thickness in the down-track direction different than or substantially equal to the first thickness. The plurality of hard bias side shields has a first width in a stripe height direction and the non-magnetic layer has a second width in the stripe height direction greater than or substantially equal to the first width. A magnetic storage device comprises the read head.

While the foregoing is directed to embodiments of the present disclosure, other and further embodiments of the disclosure may be devised without departing from the basic scope thereof, and the scope thereof is determined by the claims that follow.

What is claimed is:

1. A read head, comprising:
a lower shield;
an upper shield;
one or more lower leads disposed over the lower shield;
one or more upper leads disposed between the one or more lower leads and the upper shield;
a plurality of read sensors disposed between the one or more lower leads and the one or more upper leads at a media facing surface, each read sensor of the plurality of read sensors comprising a multilayer structure;
a plurality of soft bias side shields disposed between and outwardly of the plurality of read sensors;
a plurality of hard bias side shields disposed on and in contact with the plurality of soft bias side shields; and
a non-magnetic layer disposed between the one or more lower leads and the plurality of soft bias side shields.

2. The read head of claim 1, wherein the plurality of soft bias side shields have a first width in a stripe height direction and the lower shield has a second width in the stripe height direction greater than the first width.

3. The read head of claim 1, wherein the plurality of soft bias side shields have a first width in a stripe height direction and the lower shield has a second width in the stripe height direction substantially equal to the first width.

4. The read head of claim 1, wherein the plurality of soft bias side shields have a first thickness in a down-track direction and the plurality of hard bias side shields have a second thickness in the down-track direction, the second thickness being different than or substantially equal to the first thickness.

5. The read head of claim 1, wherein the non-magnetic layer is disposed between and in contact with the plurality of soft bias side shields and a first insulation layer.

6. A magnetic storage device comprising the read head of claim 1.

7. A read head, comprising:
a lower shield;
an upper shield;
one or more lower leads disposed over the lower shield;
one or more upper leads disposed between the one or more lower leads and the upper shield;
a plurality of read sensors disposed between the one or more lower leads and the one or more upper leads at a media facing surface, each read sensor of the plurality of read sensors comprising a multilayer structure, the multilayer structure comprising:
a buffer layer;
an anti-ferromagnetic (AFM) layer disposed over the buffer layer;
a free layer disposed over the AFM layer, the free layer comprising a first layer and a second layer;
a barrier layer disposed over the free layer; and
a cap layer disposed over the barrier layer;
a plurality of soft bias side shields disposed adjacent to and outwardly of the second layer, the barrier layer, and the cap layer of each read sensor; and
a plurality of hard bias side shields disposed on and in contact with the plurality of soft bias side shields.

8. The read head of claim 7, further comprising a non-magnetic layer disposed between the one or more lower leads and the plurality of soft bias side shields and between the one or more lower leads and the plurality of hard bias side shields.

9. The read head of claim 8, wherein the non-magnetic layer is disposed adjacent to and outwardly of the buffer layer, the AFM layer, and the first layer of each read sensor.

10. The read head of claim 8, wherein the plurality of hard bias side shields has a first thickness in a down-track direction and the non-magnetic layer has a second thickness in the down-track direction different than or substantially equal to the first thickness.

11. The read head of claim 10, wherein the plurality of hard bias side shields has a first width in a stripe height direction and the non-magnetic layer has a second width in the stripe height direction greater than or substantially equal to the first width.

12. A magnetic storage device comprising the read head of claim 7.

13. A read head, comprising:
a lower shield;
an upper shield;
one or more lower leads disposed over the lower shield;
one or more upper leads disposed between the one or more lower leads and the upper shield;
a plurality of read sensors disposed between the one or more lower leads and the one or more upper leads at a media facing surface, each read sensor of the plurality of read sensors comprising a multilayer structure;
a plurality of soft bias side shields disposed between and outwardly of the plurality of read sensors, wherein the plurality of soft bias side shields have a first width in a stripe height direction and the lower shield has a second width in the stripe height direction greater than the first width; and
a plurality of hard bias side shields disposed on and in contact with the plurality of soft bias side shields.

14. The read head of claim 13, wherein the plurality of soft bias side shields have a first thickness in a down-track direction and the plurality of hard bias side shields have a second thickness in the down-track direction, the second thickness being different than or substantially equal to the first thickness.

15. The read head of claim 13, further comprising a non-magnetic layer disposed between the one or more lower leads and the plurality of soft bias side shields.

16. The read head of claim 15, wherein the non-magnetic layer is disposed between and in contact with the plurality of soft bias side shields and a first insulation layer.

17. The read head of claim 15, wherein the plurality of hard bias side shields has a first thickness in a down-track direction and the non-magnetic layer has a second thickness in the down-track direction different than or substantially equal to the first thickness.

18. The read head of claim 15, wherein the plurality of hard bias side shields has a first width in a stripe height direction and the non-magnetic layer has a second width in the stripe height direction greater than or substantially equal to the first width.

19. A magnetic storage device comprising the read head of claim 13.

* * * * *